(12) United States Patent
Lozach et al.

(10) Patent No.: US 8,154,984 B2
(45) Date of Patent: Apr. 10, 2012

(54) METHOD FOR GENERATING MUTUALLY ORTHOGONAL SIGNALS HAVING A CONTROLLED SPECTRUM

(75) Inventors: Bruno Lozach, Lannion (FR); José Bollo, Louannec (FR); Alain Le Guyader, Lannion (FR)

(73) Assignee: France Telecom, Paris (FR)

( * ) Notice: Subject to any disclaimer, the term of this patent is extended or adjusted under 35 U.S.C. 154(b) by 309 days.

(21) Appl. No.: 12/530,540

(22) PCT Filed: Mar. 7, 2008

(86) PCT No.: PCT/FR2008/050391
§ 371 (c)(1),
(2), (4) Date: Sep. 9, 2009

(87) PCT Pub. No.: WO2008/122744
PCT Pub. Date: Oct. 16, 2008

(65) Prior Publication Data
US 2010/0103811 A1    Apr. 29, 2010

(30) Foreign Application Priority Data
Mar. 9, 2007  (FR) .................................. 07 53737

(51) Int. Cl.
*H04J 11/00*    (2006.01)
(52) U.S. Cl. ........................................ 370/208; 375/130
(58) Field of Classification Search .............. None
See application file for complete search history.

(56) References Cited

U.S. PATENT DOCUMENTS 6,014,407 A    1/2000 Hunsinger et al.
2002/0012386 A1    1/2002 Shanbhag
2005/0084000 A1*   4/2005 Krauss et al. ............. 375/148
2007/0036202 A1*   2/2007 Ge et al. .................. 375/141

FOREIGN PATENT DOCUMENTS

WO    00/01091    1/2000
WO    00/77962    12/2000

OTHER PUBLICATIONS

International Search Report dated Sep. 11, 2008, from corresponding PCT application.

* cited by examiner

*Primary Examiner* — Kevin C Harper
*Assistant Examiner* — Rhonda Murphy
(74) *Attorney, Agent, or Firm* — Young & Thompson

(57) ABSTRACT

A method for generating mutually orthogonal signals having a controlled spectrum, includes the generation of a plurality of mutually orthogonal, controlled-power discrete spectra s(i) having dimension Q, i designating spectrum number. The aforementioned spectra represent time signals in the spectral range and have a modulus $\mu$ that is constant in a spectral line designation set G and zero everywhere else. The method includes determining at least part of a complex Hadamard matrix H of order $d_R$=w in the case of spectra of real signals and $d_R$=2.w in the case of spectra of complex signals; determining the extension P of matrix H from G and dimension Q; and obtaining controlled-power spectra s(i)=$\mu$.P(H[.][i]), wherein H[.][i] designates the $i^{th}$ column of matrix H. In addition, a plurality of mutually orthogonal time signals s(i) is also generated from the discrete complex signals.

17 Claims, 11 Drawing Sheets

METHOD FOR GENERATING MUTUALLY ORTHOGONAL SIGNALS HAVING A CONTROLLED SPECTRUM

BACKGROUND OF THE INVENTION

The present invention relates to a method for generating mutually orthogonal signals having a controlled spectrum.

It has numerous and varied fields of application, including tattooing files of signals such as audio signals.

Audio tattooing by spectrum spreading uses temporal signals with a wide spectrum referred to as an extended spectrum. Tattooing uses either one or a number of signals stored in a dictionary for the modulation of symbols. When a plurality of signals is used, it is preferable to use signals whose intercorrelation product is zero, as this facilitates detection by correlation. The intercorrelation of the signals is a particular form of the scalar product. It can thus be said that seeking signals that are not correlated with each other amounts to choosing a family of mutually orthogonal signals.

In the context of tattooing, there is a requirement for signals with a controlled spectrum, i.e. that correspond to a particular template. For example, a signal coded using advanced audio coding (AAC) at 24 kbps per channel occupies a band of the order of 7 kHz, whence the benefit of controlling the spectrum of the mark by limiting its bandwidth to 7 kHz. Moreover, tattooing must also be as discreet as possible, and will therefore be modulated and shaped taking account of psychoacoustic properties. To guarantee accurate shaping, below the masking curve guaranteeing the inaudibility of the mark, the signal to be modulated must have a perfectly blank spectrum.

Real mutually orthogonal temporal signals of given length are generally generated either by orthogonalizing a family of temporal, generally random, signals or by using lines or columns of real Hadamard matrices.

Each of these prior art techniques has the drawback of producing signals whose power spectrum is difficult to control. For orthogonalization, for example, dynamic range variations of 60 dB and more are observed over the power spectrum, the spectrum being chopped and highly irregular. Moreover, the real Hadamard matrix technique can produce only signals of length 2 or multiples of 4.

In code division multiple access systems, for example CDMA systems conforming to International Standard 95, the signals used to separate the users are real orthogonal Hadamard sequences with spectrum that depends on the sequence number. This approach is described in "*UMTS, les origines, l'architecture, la norme*", Pierre LESCUYER, Dunod, 2nd edition, 2002. For example, the first line of the Hadamard matrix contains only 1s. As a result this step must be followed by a step of spectrum spreading as such, or scrambling, before modulation (see pages 116 to 119 of the above work), which increases the complexity of this kind of system.

The document WO-A-00 77962 describes a method for generating small numbers of complex orthogonal spectra, typically seven spectra, by discretizing the phase of each complex sample. This method has the particular drawback of providing only a restricted number of sequences.

SUMMARY OF THE INVENTION

To improve on the situation, the aim is to generate real signals and mutually orthogonal complex spectra of arbitrary length whose power spectra can be controllable in terms of the length of the signals generated and the number of orthogonal signals required.

Accordingly, the present invention proposes a method of generation of a plurality of discrete spectra $\hat{s}(i)$ of dimension Q, mutually orthogonal and of controlled power, i designating the number of the spectrum, said spectra representing temporal signals in the spectral domain and being of constant modulus $\mu$ in a set G designating spectrum lines and zero everywhere else, the method being remarkable in that it consists in:

determining at least part of a complex Hadamard matrix H of order $d_R=w$ in the case of real signal spectra and $d_R=2.w$ in the case of complex signal spectra;

determining the prolongation P of the matrix H from G and from the dimension Q; and obtaining the controlled power spectra $\hat{s}(i)=\mu.P(H[.][i])$, where $H[.][i]$ designates the $i^{th}$ column of the matrix H.

Thus the invention generates mutually orthogonal discrete spectra of any length, any required number and controlled power. Furthermore, it is not necessary to construct the entire complex Hadamard matrix.

In one particular embodiment, the step of determination of at least part of the complex Hadamard matrix consists in obtaining a column of a matrix of rotations calculated from predetermined rotation and permutation keys applied to a reference Hadamard matrix.

This system using keys generates varied families of spectra with little correlation.

In one particular embodiment, the method further includes a step of decomposition of the order $d_R$ of the reference Hadamard matrix into a product of factors and a substep of calculation of the lowest common multiple of the set of said factors for the determination of the reference Hadamard matrix.

Thus choosing the lowest common multiple means that the phases of the complex spectrum generated will be as far apart as possible. This increases robustness to noise.

In one particular embodiment, the method further includes a step of determining a signal:

$$s(i)[k] = \sum_{x \in Q} \left( \hat{s}(i)[x] \cdot \prod_{\alpha \in [X+T]} F_{(q_\alpha)}[k[\alpha]][x[\alpha]] \right),$$

where:

i designates the number of the signal,

Q designates a set of coordinates,

X designates the number of spatial dimensions,

T designates the number of temporal dimensions, and $F_{(q_\alpha)}$ designates the Fourier matrix of order $q_\alpha$, so as to generate a plurality of mutually orthogonal temporal signals s(i).

The present invention also proposes a method of generation of a family of temporal signals, remarkable in that it consists in combining families of mutually orthogonal temporal signals generated by a method as succinctly described above and the spectra supports whereof are separate.

Using families of complex spectra with separate power spectra quantizes the signal in the transformed domain using progressive frequency modeling of the signal by complex orthogonal spectra. In each step this approach yields optimum scale factors for the complex spectra directly, without necessitating re-optimization of the previous factors, in contrast to the prior art, which uses a Gram-Schmidt method for this re-optimization.

The present invention also proposes the use of mutually orthogonal temporal or complex spectrum signals generated by a method as succinctly described above for spectrum spreading in spread spectrum transmission systems.

By their construction, these signals or spectra are spectrum spread in the transmitted band and their power is of value 1, in contrast to the Hadamard sequences used in the current American IS95 code division multiple access system. In the field of audio coders, they can be used as quantization dictionaries in predictive coders. In this case, quantization is effected by two fast algorithms: on the one hand, one for each fast Fourier transform for passage into the frequency domain and, on the other hand, for the scalar product involved in the quantization.

The present invention also proposes the use of mutually orthogonal temporal or complex spectrum signals generated by a method as succinctly described above for audio tattooing and its detection.

In audio tattooing, these spectra can be used directly for tattooing in the frequency domain, their ideally blank power spectrum in the band or bands transmitted enabling them to be shaped accurately by psychoacoustic weighting, which is an important property for ensuring that the tattooing is inaudible. Prior art spectra do not provide for this accurate shaping, given that their power spectrum has a non-negligible dynamic range variation. In code division multiple access transmission systems the complex spectra of the invention also have the advantage of being easy to modulate as they stand, in defined frequency bands.

In audio tattooing the signals in the time domain can be used directly for spread spectrum tattooing, in which a symbol on $K_b$ bits is represented by $K_b$ orthogonal signals. The same advantages are obtained as those mentioned above for complex spectra.

The present invention also proposes the use of controlled power mutually orthogonal complex spectra generated by a method as succinctly described above for coding or representing audio signals quantized with the aid of a dictionary or a family of dictionaries of real or complex values.

In audio coders, these spectra can be used as quantization dictionaries for the signals produced by a discrete Fourier transform. In this case, quantization is effected by a fast algorithm, for example, whose structure is derived from the manner in which the dictionary is constructed (in one particular embodiment, by Kronecker products of small basic matrices).

The present invention also proposes the use of controlled power mutually orthogonal temporal or complex spectrum signals generated by a method as succinctly described above for optimization of metrology excitation data.

For calculating the impulse response of acoustic rooms in metrology, the fact that the sequences generated have an ideally flat in-band spectrum improves the accuracy of detection compared to the routine use of pseudo-noise sequences generated by shift registers, the correlation function of which includes a term that is parasitic with respect to its ideal value, which is a Dirac.

In a correlated way, the invention proposes a device for generation of a plurality of discrete spectra $\hat{s}(i)$ of dimension Q, mutually orthogonal and of controlled power, i designating the number of the spectrum, said spectra representing temporal signals in the spectral domain and being of constant modulus $\mu$ in a set G designating spectrum lines and zero everywhere else, the device being remarkable in that it includes:
  a module for determining at least part of a complex Hadamard matrix H of order $d_R=w$ in the case of real signal spectra and $d_R=2.w$ in the case of complex signal spectra;
  a module for determining the prolongation P of the matrix H from G and from the dimension Q; and
  a module for obtaining the controlled power spectra $\hat{s}(i)= \mu.P(H[.][i])$, where $H[.][i]$ designates the $i^{th}$ column of the matrix H.

The present invention further proposes a computer program product adapted to be loaded into a programmable device, remarkable in that it includes sequences of instructions for implementing a method as succinctly described above when the program is loaded and executed by the programmable device.

The particular characteristics and advantages of the method of generating a family of temporal signals, of the various uses of the temporal signals or complex spectra, of the device for generating a plurality of discrete spectra, and of the computer program product being similar to those of the method for generating a plurality of discrete spectra, are not repeated here.

BRIEF DESCRIPTION OF THE DRAWINGS

Other aspects and advantages of the invention will become apparent on reading the following detailed description of particular embodiments of the invention, given by way of nonlimiting example. The description refers to the accompanying drawings, in which.

DESCRIPTION OF PREFERRED EMBODIMENTS

Figure 1:
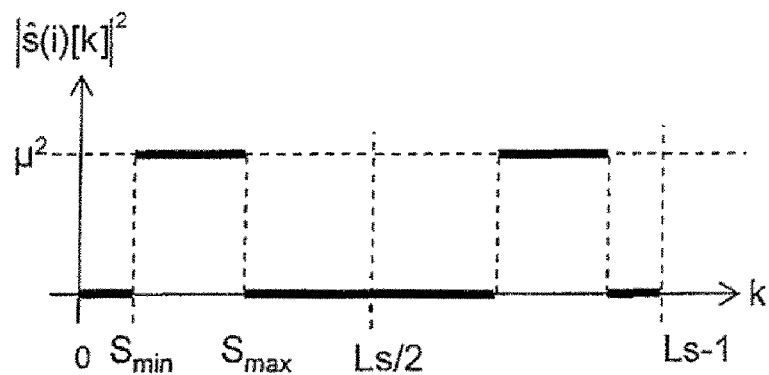
FIG. 1 is a graph representing the power spectrum of the signals generated in one particular embodiment of the invention.

The invention applies to discrete real or complex signals.
Notation and definitions used in the remainder of the description are introduced below.

By convention, the indices of variables begin at zero. Accordingly, a three-dimensional vector v has three components denoted: v[0], v[1], v[2]. Likewise, for matrices, m[l][c] denotes the component of line l and column c (starting at zero) of the matrix m.

The number of signals generated is denoted Ns.

The signals to be generated are denoted s(i), where $0 \leq i < Ns$, i being the variable that designates the number of the signal.

Each signal s(i) can be seen interchangeably either as a signal of length Ls or as an application of $[0;Ls-1] \subset N$ (N being the set of natural integers), or as a vector of dimension Ls. This latter interpretation, i.e. the vectorial interpretation, is preferred here.

From the vectorial point of view, each signal s(i) is a vector of $E^{Ls}$ (the Cartesian product of the vectorial space E to the power Ls) where E is either the body of real values $\Re$ (in the case of a signal with real values) or the body of complex values C (in the case of a signal with complex values). The values of the signal s(i) are denoted s(i)[n], where $0 \leq n < Ls$, n being the variable that designates the time sample.

Hereinafter, Fourier matrices denoted $F_{(n)}$ of any order (or dimension) are used. The Fourier matrix of order n is the square matrix defined by $F_{(n)} \in C^{n \times n}$ and $$F_{(n)}[l][c] = e^{2\pi \cdot \frac{l \cdot c}{n} \cdot \sqrt{-1}} \quad (1.1)$$

This matrix has the following properties: $|F_{(n)}[l][c]|=1$ and $$\overline{F_{(n)}} \cdot F_{(n)} = n1_{(n)} \quad (1.2)$$

where $\overline{F_{(n)}}$ denotes the conjugate matrix of $F_{(n)}$, $^tF_{(n)}$ denotes the transposed matrix of the matrix $F_{(n)}$ and $1_{(n)}$ denotes the identity matrix of order n, from which is deduced $$F_{(n)}^{-1} = \frac{1}{n} \cdot {}^t\overline{F_{(n)}}.$$

$^t$F and F are respectively the discrete Fourier transform (DFT) matrix and the inverse discrete Fourier transform matrix. The present invention uses the matrix F in two different contexts:
- to transform a controlled power complex spectrum into a temporal signal, and
- as a real or complex basic Hadamard matrix for generating the Hadamard matrices of any order using Kronecker products.

The problem to be solved is that of finding a family S of Ns signals such that there is a zero scalar product of two signals s(i) and s(j), denoted $\langle s(i)|s(j)\rangle$, if i is different from j, which amounts to saying that the signals are mutually orthogonal according to the scalar product concerned.

In other words, using the mathematical notation introduced above, it is a question of finding $S=\{s(i)\}$ such that $\langle s(i)|s(j)\rangle = 0 \Leftrightarrow i \neq j$.

The usual scalar products are considered:
in the real case (E=$\Re$): $\langle a|b\rangle = {}^t a.b$
in the complex case (E=C): $\langle a|b\rangle = {}^t\overline{a}.b$ It is also necessary to consider the discrete complex spectra $\hat{s}(i) \in C^{Ls}$ defined in terms of the temporal signals s(i) as follows:

$$\hat{s}(i) = F_{Ls}^{-1} \cdot s(i) \quad (1.3)$$

In other words, the complex spectrum is obtained by applying a discrete Fourier transform to the real signal. The spectra are referred to as discrete as they come from the discrete Fourier transform of a discrete signal, i.e. a signal sampled in the time domain at a given frequency $F_e$.

The power spectrum of the temporal signal is given as a function of the complex spectrum by:

$$P_s(i)[k] = |\hat{s}(i)[k]|^2 = \langle \hat{s}(i)[k]|\hat{s}(i)[k]\rangle = \overline{\hat{s}(i)[k]} \cdot \hat{s}(i)[k]$$

Hereafter, the term controlled power is applied interchangeably to the temporal signal and the complex spectrum.

The matrices $F_{(Ls)}$ and $^tF_{(Ls)}$ being orthogonal (equation (1.2)), the temporal signal is given as a function of the complex spectrum by:

$$s(i) = F_{(Ls)} \cdot \hat{s}(i) \quad (1.4)$$

i.e. by the inverse discrete Fourier transform of the complex spectrum.

It is shown that a necessary and sufficient condition for the signal s(i) to be real (E=$\Re$) is that the following are satisfied:

$$\hat{s}(i)[0] = \overline{\hat{s}(i)[0]} \text{ and } \forall k \in [1 \ldots Ls-1] \hat{s}(i)[k] = \overline{\hat{s}(i)[Ls-k]} \quad (15)$$

In other words, for the inverse Fourier transform of a complex spectrum to be real, the complex spectrum $\hat{s}(i)$ must satisfy the above property of symmetry.

Complex Hadamard matrices are square matrices H of any order d (i.e. $H \in C^{d \times d}$) having the following properties: $^t\overline{H}.H = d.1_{(d)}$ (orthogonality property) and $|H[l][c]|=1$. Note that Fourier matrices are complex Hadamard matrices. Complex Hadamard matrices also have the following properties:
if H is a complex Hadamard matrix, if P, Q are permutation matrices, if C, D are diagonal matrices the non-zero elements of the diagonal of which have a modulus of 1, then P.C.H.D.Q is also a complex Hadamard matrix;
if G and H are two complex Hadamard matrices of respective orders g and h, then $G \otimes H$ is a complex Hadamard matrix of order g.h. The operation $\otimes$ is the Kronecker product or tensor product.

Remember that:

$$(G \otimes H)[l][c] = (G[l_g][c_g])(H[l_h][c_h]) \quad (1.6)$$

where $l=l_g.h+l_h$ and $c=c_g.h+c_h$.

The basic principle of the solution proposed by the present invention is described next.

For the basic discrete solution, the family S of the required real signals has to satisfy the following properties:

$$\begin{cases} \langle s(i)|s(i)\rangle = 1 \\ \langle s(i)|s(j)\rangle = 0 \Leftrightarrow i \neq j \\ k \in [S_{min} \ldots S_{max}] \cup [Ls - S_{max} \ldots Ls - S_{min}] \Leftrightarrow |\hat{s}(i)[k]| = \mu \\ k \notin [S_{min} \ldots S_{max}] \cup [Ls - S_{max} \ldots Ls - S_{min}] \Leftrightarrow \hat{s}(i)[k] = 0 \end{cases} \quad (1.7)$$

These properties are illustrated by the FIG. 1 graph, which represents the value of the power spectrum of the signals generated.

These properties express the fact that the temporal signals have a unitary power over one period, and that the complex spectrum of these signals is of constant modulus, $\mu$, between a low frequency index $S_{min}$ and a high frequency index $S_{max}$ and zero everywhere else.

The low frequency $F_{min}$ is linked to the index $S_{min}$ and to the sampling frequency $F_e$ as follows:

$$S_{min} = F_{min} \frac{Ls}{F_e}$$

where Ls is the number of samples of the DFT defined by the equation (1.3).

The phases are the only degrees of freedom of the system. Moreover, the signals form a free family in the space of signals of length Ls and are mutually orthogonal or, in other words, there is no correlation between them.

Note that the special case $S_{min}=0$ and $S_{max}=Ls/2$, where there is no zero sample, is taken into account in the equation (1.7) by virtue of the periodicity of the complex spectrum $\hat{s}(i)$ (period Ls). The spectrum of the frequency domain signals is then perfectly blank over the whole of the band of frequencies and the orthogonal temporal signal correlation function, deduced by inverse Fourier transformation, is equal to a Dirac distribution, a property of interest in numerous applications. The temporal signals are real if the property of symmetry with conjugate complex (equation (1.5)) is satisfied.

Noting that the temporal signals are given by inverse Fourier transformation of complex spectra (equation (1.4)), it can be shown that:

$$\langle s(i) | s(j) \rangle = \langle F_{(Ls)} \cdot \hat{s}(i) | F_{(Ls)} \cdot \hat{s}(j) \rangle = \overline{{}^t \hat{s}(i)} \cdot {}^t\overline{F_{(Ls)}} \cdot F_{(Ls)} \cdot \hat{s}(j) = Ls \cdot (\overline{{}^t \hat{s}(i)} \cdot \hat{s}(j)) = Ls \langle \hat{s}(i) | \hat{s}(j) \rangle.$$

The problem then amounts to the orthogonality of the signals in the domain of the complex spectra $\hat{s}(i)$.

As there are zero spectrum lines outside the combined ranges $[S_m \ldots S_{max}] \cup [Ls-S_{max} \ldots Ls-S_{min}]$, it is sufficient to ensure orthogonality of the values of the discrete spectrum signals $\hat{s}(i)$ for $k \in [S_m \ldots S_{max}] \cup [Ls-S_{max} \ldots Ls-S_{min}]$. The number corresponding to half the number of lines of modulus $\mu$ is denoted $w=1+S_{max}-S_{min}$.

This operation is known as restriction, and restricts the study to non-zero values. It is denoted $R:C^{Ls} \to C^{2 \cdot w}$. The converse operation is called prolongation and is denoted $P:C^{2 \cdot w} \to C^{Ls}$.

In the real situation, it suffices to restrict for $k \in [S_{max} \ldots S_{min}]$. The remaining values, of index $k \in [Ls-S_{max} \ldots Ls-S_{min}]$, are deduced from the preceding values by conjugation according to the property $\hat{s}(i)[k] = \overline{\hat{s}(i)[Ls-k]}$ of the real signals, as outlined above. In this case $R:C^{Ls} \to C^w$ and $P:C^w \to C^{Ls}$.

The restriction of $\hat{s}(i)$ is denoted $\hat{r}(i)$. The dimension of the restriction $\hat{r}(i)$ is denoted $d_R$, i.e. $\hat{r}(i) \in C^{d_R}$. In the case of real signals $d_R=w$ and in the case of complex signals $d_R=2 \cdot w$. Given $\hat{r}(i)=R(\hat{s}(i))$, what is sought is a family $\hat{R}=\{\hat{r}(i)\}$ of Ns vectors $\hat{r}(i)$ such that $s(i)=F_{(Ls)} \cdot P(\hat{r}(i))$, i.e. $S=F_{(Ls)} \cdot P(\hat{R})$.

Satisfying the properties required for the $s(i)$ lead to writing the following properties for the $\hat{r}(i)$:

$$\begin{cases} |\hat{r}(i)[p]| & \forall i \; \forall p \\ \langle \hat{r}(i) | \hat{r}(j) \rangle = 0 & \Leftrightarrow i \neq j \end{cases}$$

These properties or constraints are close to those of the vectors of the complex Hadamard matrices. The solution to this problem is thus obtained by choosing for the family $\hat{R}$ a free family coming from a complex Hadamard matrix H of order $d_R$ multiplied by $\mu$.

In the same case where $\hat{r}(i)$ corresponds to the $i^{th}$ column of the matrix H, which is denoted $\hat{r}(i)=\mu.H[.][i]$:

$$s(i) = F_{(Ls)} \cdot P(\mu \cdot H[\cdot][i]) = \mu \cdot F_{(Ls)} \cdot P(H[\cdot][i])$$

$$\langle s(i) | s(j) \rangle = Ls \cdot ({}^t(\overline{\hat{s}(i)}) \cdot \hat{s}(j)) = Ls \cdot ({}^t\overline{P(\hat{r}(i))} \cdot P(\hat{r}(j)))$$

-continued $$\langle s(i) | s(j) \rangle = \frac{2 \cdot Ls \cdot w \cdot \mu^2}{d_R} \cdot \begin{pmatrix} {}^t\overline{H[\cdot][i]} \cdot \\ H[\cdot][j] \end{pmatrix} = \frac{2 \cdot Ls \cdot w \cdot \mu^2}{d_R} \cdot [({}^t\overline{H} \cdot H)[i][j]]$$

Thus:

$$\langle s(i) | s(j) \rangle = 2 \cdot Ls \cdot w \cdot \mu^2 \cdot (I_{(d_r)}[i][j]) \Leftrightarrow \begin{cases} i = j \Leftrightarrow \langle s(i) | s(j) \rangle = 2 \cdot Ls \cdot w \cdot \mu^2 \\ i \neq j \Leftrightarrow \langle s(i) | s(j) \rangle = 0 \end{cases}$$

Dimensional analysis shows that the following conditions must be respected: $Ns \leq d_R$, and, in the real case, $d_R \leq \frac{1}{2}Ls$, and, in the complex case, $d_R \leq Ls$. These are the constraints of the system.

Synthesizing, S is a free family of $\mu.F.P(H)$, where F is the Fourier matrix, P is the prolongation deduced from $S_{max}$ and $S_{min}$ and H is the complex Hadamard matrix of order $d_R$ deduced from $S_{max}$ and $S_{min}$.

How to construct a family S of temporal signals s(i) having the properties of the equation (1.7) is described above:

It suffices to find a complex Hadamard matrix H and then to take:

$$s(i) = \mu \cdot F_{(Ls)} \cdot P(H[\cdot][i]) \text{ where } \mu = \frac{1}{\sqrt{2 \cdot Ls \cdot w}},$$

where P is the prolongation deduced from $S_{max}$ and $S_{min}$ and from the nature of E (real or complex), and where $F_{(Ls)}$ is the Fourier matrix of order Ls, which, in other words, corresponds to the "inverse discrete Fourier transform in the complex domain", often denoted $TFD_{(Ls)}^{-1}$. One of the following two definitions then often applies:

$$TFD_{(Ls)}^{-1}(x) = \frac{1}{Ls} \cdot F_{(Ls)} \cdot x \text{ or } TFD_{(Ls)}^{-1}(x) = F_{(Ls)} \cdot x.$$

This discrete Fourier transform is advantageously effected by a fast Fourier transform, an operation well known to the person skilled in the art.

Figure 2:
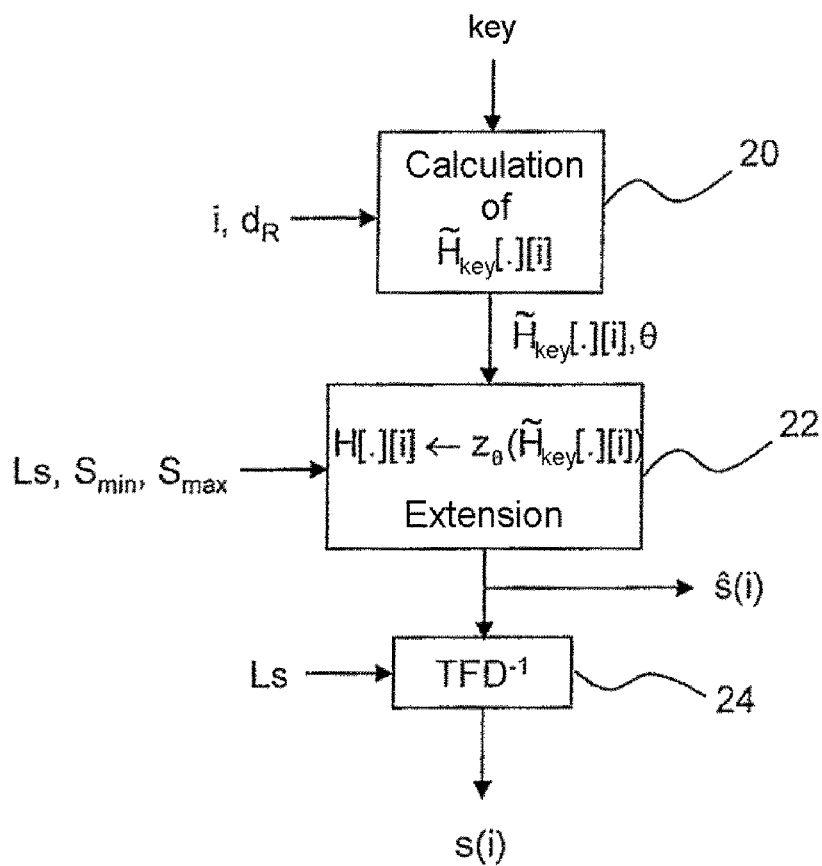
FIG. 2 is a flowchart showing the main steps of one particular embodiment of a method of the present invention of generating temporal signals.

This method of constructing the s(i), the basic subject matter of the present invention, is shown diagrammatically in FIG. 2.

The module 20 calculates the $i^{th}$ column of a matrix of rotations of a complex Hadamard matrix $\tilde{H}_{key}$ the generation whereof depends on a key.

The rotations are expressed by integer numbers, i.e.:
$\tilde{H}_{key}[.][i] \in Z^{d_R}$.
For the formula $$z_e(n) = e^{2\pi \frac{n}{\theta} \sqrt{-1}},$$

the value $\theta$ goes from the entire rotation to the corresponding complex number of modulus 1.

A key is used to obtain distinct signal families. In an application of the present invention to tattooing signal files, this provides for distinct tattooings that can be superposed without interacting.

The key is an integer number used to generate two permutations of Ns elements and twice Ns entire rotations of order $\theta$, i.e. a number from 1 to $[Ns! . \theta^{Ns}]^2$. In practice, these numbers usually being very large, the keys are used to initialize a generator for extracting the necessary information. The introduction of the key enables the introduction of a secret into the process of generating the sequences and thus of restricting the possibility of their use exclusively to holders of the key.

The module 22 transforms a vector of rotations of $Z^{d_R}$ into a discrete spectrum complex vector of $C^{Ls}$.

The transformation depends on the nature of the signal but does not depend on i.

In the case of real signals:

$$\begin{cases} S_{min} \leq k \leq S_{max} & \Rightarrow \hat{s}(i)[k] = \mu \cdot z_\theta(\tilde{H}_{key}[k-S_{min}][i]) \\ Ls - S_{max} \leq k \leq Ls - S_{min} & \Rightarrow \hat{s}(i)[k] = \mu \cdot z_\theta(\overline{\tilde{H}_{key}[Ls-S_{min}-k][i]}) \\ \text{otherwise} & \Rightarrow \hat{s}(i)[k] = 0 \end{cases}$$

In the case of complex signals:

$$\begin{cases} S_{min} \leq k \leq S_{max} & \Rightarrow \hat{s}(i)[k] = \mu \cdot z_\theta(\tilde{H}_{key}[k-S_{min}][i]) \\ Ls - S_{max} \leq \\ k \leq Ls - S_{min} & \Rightarrow \hat{s}(i)[k] = \mu \cdot z_\theta\left(\tilde{H}_{key}\begin{bmatrix} k+2 \cdot S_{max} + \\ 1 - Ls - S_{min} \end{bmatrix}[i]\right) \\ \text{otherwise} & \Rightarrow \hat{s}(i)[k] = 0 \end{cases}$$

In the case limited to generation of mutually orthogonal complex spectra, the procedure terminates at this stage.

The complex spectrum ŝ(i) can be used as such, as shown in FIG. 2 by an exit arrow from the algorithm.

Otherwise, mutually orthogonal temporal signals are generated by the module 24, which transforms a complex vector ŝ(i) in $C^{Ls}$ and with controlled spectrum into a controlled discrete spectrum time vector of $E^{Ls}$.

The module 24 is a module for application of an inverse discrete Fourier transform of order Ls. This operation is well known to the person skilled in the art. It does not depend on i.

The operations effected by the module 20 for calculating $\tilde{H}_{key}[.][i]$ are described in detail below.

As stated above, this module calculates a column of the matrix $\tilde{H}_{key}$. This has the advantage of avoiding construction of the complex matrix and therefore of simplifying and accelerating the calculations.

Formally, the matrix of the rotations is expressed as follows:

$$\tilde{H}_{key} = \frac{\theta}{2\pi\sqrt{-1}} \cdot \ln(H_{key}),$$

where $H_{key} = R_{key,line} P_{key,line} H_{ref} \cdot P_{key,col} R_{key,col}$, where:

$P_{key,line}$ and $P_{key,col}$ are the permutation matrices corresponding to the permutations $\sigma_{key,line}$ and $\sigma_{key,col}$;

$R_{key,line}$ and $R_{key,col}$ are diagonal matrices of rotations (of lines and columns) that correspond to the rotations $R_{key,line}[X][X] = z_\theta(\rho_{key,line}(X))$ and $R_{key,col}[X][X] = z_\theta(\rho_{key,col}(X))$. In practice, any rotations can be used and not only rotations of order $\theta$, i.e. the matrices $R_{key,line}$ and $R_{key,col}$ can also be defined as the diagonal matrices $$R_{key,row}[X][X] = e^{2\pi\sqrt{-1}\cdot\rho_{key,row}(x)}$$

and $$R_{key,col}[X][X] = e^{2\pi\sqrt{-1}\cdot\rho_{key,col}(x)}.$$

In practice, the application of the rotations is optional;

$H_{ref}$ is the reference complex Hadamard matrix canonically constructed by the method as a function of $d_R$;

θ is the smallest order of the root of the unity that enables the rotations to be expressed by integers.

The calculation becomes:

$$\begin{cases} \tilde{H}_{key}[l][c] = \tilde{H}_{ref}[\sigma_{key,line}(l)][\sigma_{key,col}(c)] + \rho_{key,line}(l) + \rho_{key,col}(c) \\ \tilde{H}_{ref} = \frac{\theta}{2\pi\sqrt{-1}} \cdot \ln(H_{ref}) \end{cases} \quad (1.8)$$

The expression of the auxiliary functions $\sigma_{key,line}$ and $\sigma_{key,col}$ and $\rho_{key,line}$ and $\rho_{key,col}$ is trivial. The permutations can be effected by scrambling algorithms well known in cryptography for example and the rotations can be initialized by a random function for introducing a secret.

In the context of the description of the method, it is assumed that these auxiliary functions have been calculated and are known.

The number $d_R$, which represents the order of the reference complex Hadamard matrix $H_{ref}$ is written as a product of numbers. $DF(d_R) = \{f_i\}$ denotes a decomposition of $d_R$ into a product of factors $f_i$ (accordingly, $$d_R = \prod_{f_i \in DF(d_R)} f_i$$

that is ordered arbitrarily according to an index i varying from 1 to Nf, where Nf denotes the number of factors of the decomposition of $d_R$, i.e. $Nf = |DF(d_R)|$. In practice, a decomposition into prime factors can be taken for DF.

For example, $d_R = 100 \Rightarrow DF(d_R) = \{2;2;5;5\}$ and $Nf = 4$.

The reference complex Hadamard matrix $H_{ref}$ constructed by the method is defined as follows:

$$H_{ref} = F_{(f_1)} \otimes F_{(f_2)} \otimes \ldots \otimes F_{(f_{Nf})} = \bigotimes_{1 \leq i \leq Nf} F_{(f_i)} \quad (1.9)$$

The basic matrices $F_{(f_i)}$, $i = 1, \ldots, Nf$ can be Fourier matrices as defined above. More generally, complex Hadamard matrices of size $f_i$ can be used. The generation of $H_{ref}$ by a Kronecker product from basic matrices can be exploited if, to effect the calculations with minimum complexity, the scalar product of all complex spectra by a vector x is required, i.e. $\langle \hat{s}(i)|x\rangle$ $i = 0, \ldots, Ns-1$. The result of this is an algorithm of complexity $d_R \log_2 d_R$ having a structure close to that of the Hadamard transform.

According to the definition of $H_{ref}$ by the equation (1.9), the order of the root of the unity is the lowest common multiple of the set of factors of $d_R$, whence $\theta = \text{ppcm}(DF(d_R)) = \text{ppcm}(\{f_i\})$. For example, $\theta(100) = 10$.

If the decomposition of $d_R$ into prime factors is taken for DF, this approach has the advantage that θ is as small as possible, which means that the phases of the complex spectrum are as far apart as possible. Incidentally, this increases robustness to noise.

The calculation of the matrices of integers $\tilde{H}_{ref}[l][c]$ relies on the fact that a number n such that $0 \leq n < d_R$ is decomposed uniquely in the number system deduced from $DF(d_R)$, namely:

$$n = \sum_{1 \leq i \leq Nf} \left( n_i \cdot \prod_{1 \leq j < i} f_j \right) = \sum_{1 \leq i \leq Nf} n_i \cdot b_i = n_1 + f_1 \cdot (n_2 + f_2 \cdot (n_3 + \ldots))$$

where $$0 \leq n_i < f_i \text{ and } b_i = \prod_{1 \leq j < i} f_j.$$

This in fact constitutes a generalization of the equation (1.6) to the case of the decomposition of $d_R$ into a product of factors.

Accordingly, having defined, i.e. decomposed the line number $$l = \sum_{1 \leq i \leq Nf} l_i \cdot b_i$$

and the column number $$c = \sum_{1 \leq i \leq Nf} c_i \cdot b_i,$$

there is obtained, following the following calculations:

$$\tilde{H}_{ref}[l][c] = \frac{\theta}{2\pi \cdot \sqrt{-1}} \ln(H_{ref}[l][c])$$

$$= \frac{\theta}{2\pi \cdot \sqrt{-1}} \ln\left(\left[\bigotimes_{1 \leq i \leq Nf} F_{(f_i)}\right][l][c]\right)$$

$$\tilde{H}_{ref}[l][c] = \frac{\theta}{2\pi \cdot \sqrt{-1}} \ln\left(\prod_{1 \leq i \leq Nf} F_{(f_i)}[l_i][c_i]\right)$$

$$= \frac{\theta}{2\pi \cdot \sqrt{-1}} \sum_{1 \leq i \leq Nf} \ln\left(e^{\frac{l_i \cdot c_i}{f_i} \cdot 2\pi\sqrt{-1}}\right),$$

$$\tilde{H}_{ref}[l][c] = \sum_{1 \leq i \leq Nf} \frac{\theta}{2\pi \cdot \sqrt{-1}} \cdot \frac{l_i \cdot c_i}{f_i} \cdot 2\pi\sqrt{-1}$$

the required value:

$$\tilde{H}_{ref}[l][c] = \sum_{1 \leq i \leq Nf} \left(\frac{\theta}{f_i}\right) l_i \cdot c_i.$$

The factor $$\frac{\theta}{f_i}$$

being an integer, $\tilde{H}_{ref}$ is a matrix of integers, which is what was required.

Figure 3:
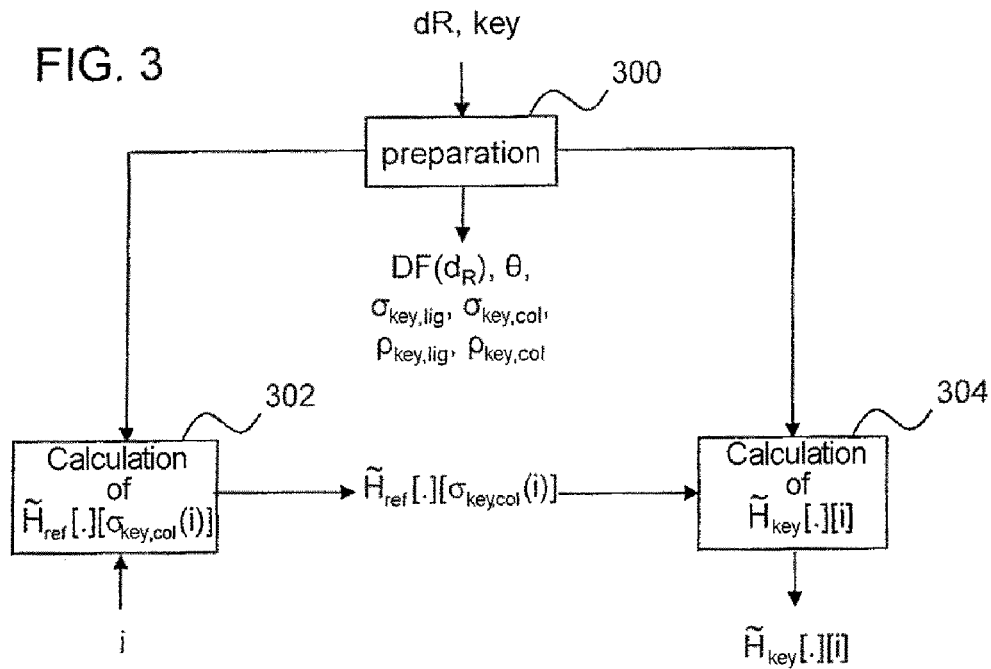
FIGS. 3 to 6 are flowcharts showing details of various operations effected to obtain a column of a matrix of the rotations of a complex Hadamard matrix in one particular embodiment of the present invention.

FIG. 3 shows the organization of the process for calculating the $i^{th}$ column of the matrix of the rotations $\tilde{H}_{key}[.][i]$.

The preparation step 300 consists in:

a) calculating the decomposition of $d_R$ into a product of factors $f_i$ denoted $DF(d_R) = \{f_i\}$;

b) calculating the lowest common multiple of the set $DF(d_R)$, denoted $\theta = ppcm(DF(d_R))$;

c) using the key to calculate the auxiliary functions $\sigma_{key,line}$, $\sigma_{key,col}$, $\rho_{key,col}$ and $\rho_{key,line}$.

The step 302 effects the permutation $\sigma_{key,col}(i)$ and then calculates $\tilde{H}_{ref}[.][\sigma_{key,col}(i)]$ directly. The contribution of the rotations according to the equation (1.8) is added to this latter matrix in the step 304.

Figure 4:
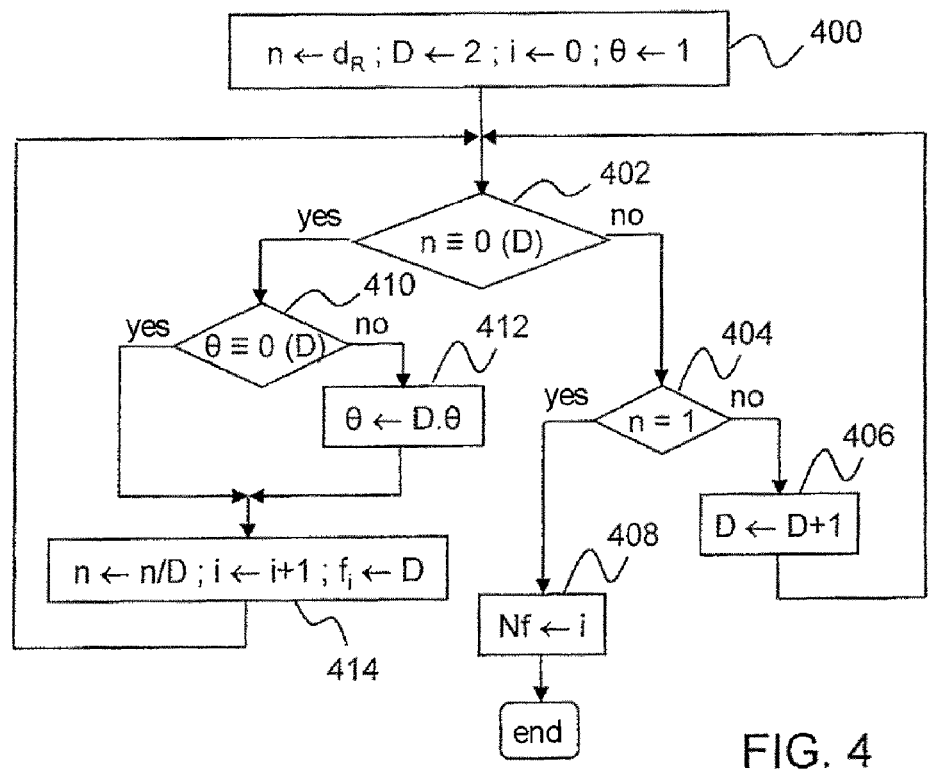

The FIG. 4 flowchart illustrates an elementary example of the execution of the operations a) and b).

During an initialization step 400, a variable n is initialized to the value $d_R$, a variable D to the value 2, a variable i to the value 0 and a variable $\theta$ to the value 1.

A test 402 is then effected to verify if n is congruent with zero modulo D, i.e. if n is a multiple of D.

If the result of the test 402 is negative, there follows a test 404 for verifying if n has the value 1.

If the result of the test 404 is negative, the value of the variable D is increased by one unit (step 406) and there is a return to the test 402. If the result of the test 404 is positive, the value of i (step 408) is assigned to the variable Nf, which denotes the number of factors of the decomposition of $d_R$, and the algorithm terminates.

If the result of the test 402 is positive, a test 410 is effected that verifies if $\theta$ is congruent with zero modulo D.

If the result of the test 410 is negative, the variable $\theta$ is assigned the value of the variable $D.\theta$ (step 412) and there follows the step 414. If the result of the test 410 is positive, the process goes directly to step 414.

The step 414 assigns to the variable n the value of the variable n/D, incrementing the value of the variable i by one unit and assigning the variable $f_i$ the value of the variable D. This is followed by a return to the test 402.

Returning to FIG. 3, the operation 302 of calculating the column $\tilde{H}_{key}[.][\sigma_{key,col}(i)]$ calculates $$\tilde{H}_{ref}[l][c] = \sum_{1 \leq j \leq Nf} \left(\frac{\theta}{f_j}\right) l_j \cdot c_j$$

where $c = \sigma_{key,col}(i).$

Figure 5:
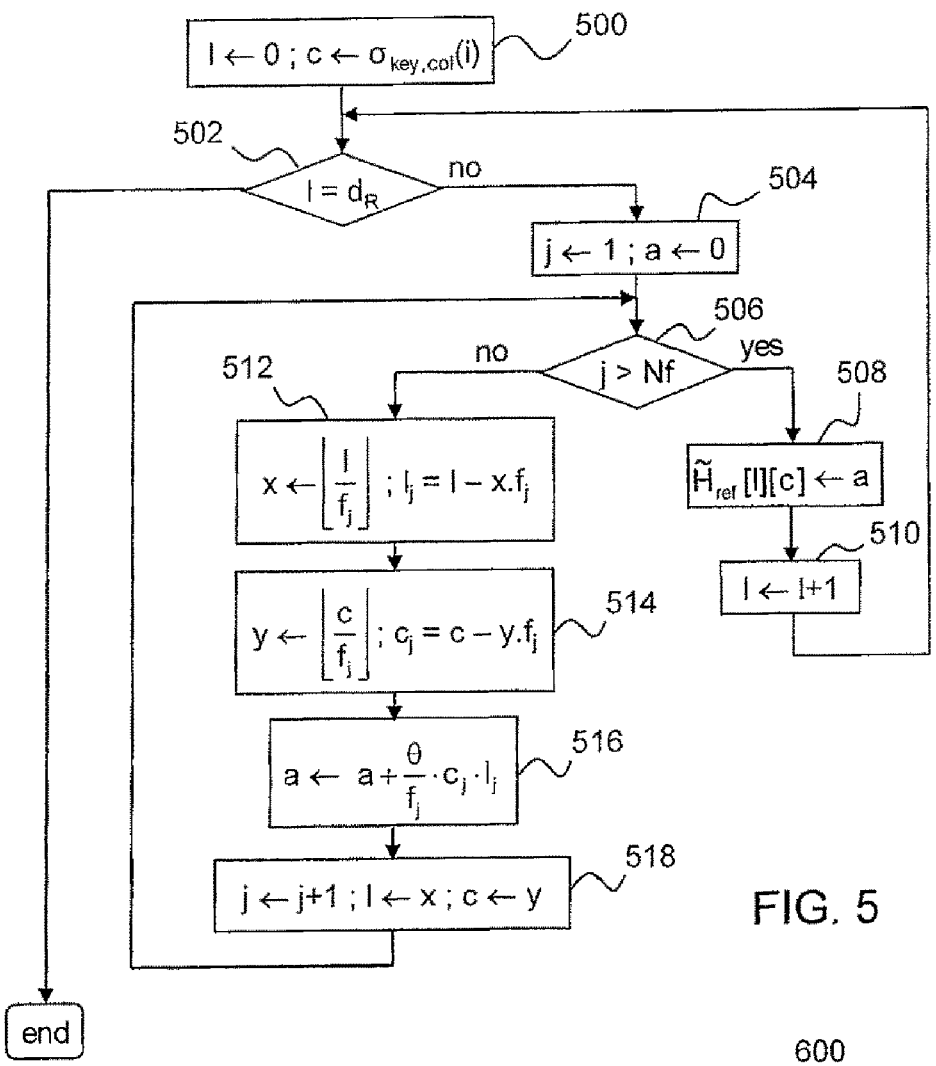

The FIG. 5 flowchart is an elementary example of the implementation of this step.

The values of $l_j$ and $c_j$ are calculated progressively.

Accordingly, during an initialization step 500, a variable l is initialized to the value 0 and a variable c is initialized to the value of the auxiliary function $\sigma_{key,col}(i)$.

A test 502 then verifies if $l=d_R$. If the result of the test 502 is positive, the algorithm terminates. Otherwise, a variable j is initialized to the value 1 and a variable a to the value 0 (step 504).

A test 506 then verifies if j>Nf, where Nf denotes the number of prime factors of $d_R$. If the result of the test 506 is positive, the value of the variable is assigned to the variable $\tilde{H}_{ref}[l][c]$ (step 508), the value of the variable l is incremented by one unit (step 510) and the process returns to the test 502.

If the result of the test 506 is negative, the value of $$\left\lfloor \frac{l}{f_j} \right\rfloor$$

(the symbol $\lfloor . \rfloor$ designates the integer part) is assigned to the variable x and $l_j = l - x.f_j$ is calculated (step 512).

The value of $$\left\lfloor \frac{c}{f_j} \right\rfloor$$

is then assigned to the variable y and $c_j = c - y.f_j$ is calculated (step 514).

The next step 516 assigns the value of $$a + \frac{\theta}{f_j} \cdot c_j \cdot l_j$$

to the variable a.

Then, during the step 518, the value of the variable j is incremented by one unit, the value of the variable x is assigned to the variable l, and the value of the variable y is assigned to the variable c.

There follows a return to the test 506.

Returning to FIG. 3, the operation 304 calculates the column $\tilde{H}_{key}[.][i]$ by calculating:

$$\tilde{H}_{key}[l][i] = \tilde{H}_{ref}[\sigma_{key,line}(l)][\sigma_{key,col}(i)] + \rho_{key,line}(l) + \rho_{key,col}(i).$$

Figure 6:
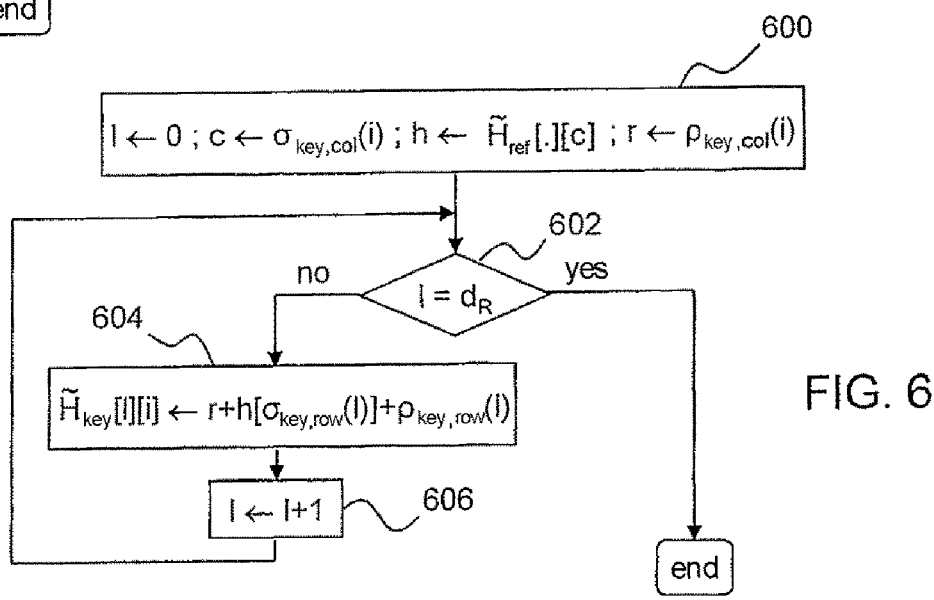

The FIG. 6 flowchart shows one implementation of this operation.

As FIG. 6 shows, the initialization step 600 consists firstly in initializing a variable l to the value 0, a variable c to the value of the auxiliary function $\sigma_{key,col}(i)$, a variable h to the value of $\tilde{H}_{ref}[.][c]$ and a variable r to the value of the auxiliary function $\rho_{key,col}(i)$.

Then, during a test 602, it is verified if $l = d_R$. If the result of this test is positive, the algorithm terminates. Otherwise, the variable $\tilde{H}_{key}[l][i]$ is assigned the value of the expression $r + h[\sigma_{key,line}(l)] + \rho_{key,line}(l)$ (step 604).

The value of the variable l is then incremented by one unit (step 606) followed by returning to the test 602.

There is described next how the basic method of the present invention described above for generating mutually orthogonal temporal signals is applied generally.

It was shown hereinabove that the basic method generates mutually orthogonal temporal signals or complex spectra according to a power spectrum template represented in FIG. 1. This approach was didactic and was used to explain the basic operation: the generation of $\tilde{H}_{key}[l][i]$.

In its most general form, the present invention generates families $S = \{s(i)\}$ of mutually orthogonal discrete signals of the evolution space A of the system:

$$A = (E^{Y_1 x Y_2 x \ldots x Y_X})^{Z_1 x Z_2 x \ldots x Z_T} = E^{Y_1 x Y_2 x \ldots x Y_X x Z_1 x Z^{2x} \ldots Z_T}$$

having X real spatial dimensions ($E = \Re$) or complex spatial dimensions ($E = C$) and T time dimensions and the family $\hat{S} = \{\hat{s}(i)\}$ of their mutually orthogonal complex spectra in:

$$(C^{Y_1 x Y_2 x \ldots x Y_X})^{Z_1 x Z_2 x \ldots x Z_T} = C^{Y_1 x Y_2 x \ldots x Y_X x Z_1 x Z_2 x \ldots Z_T}$$

according to spectral constraints that will become apparent during the description of the method in its widest sense.

The set of positive or zero integers less than n is denoted [n] ($[n] = \{0; 1; 2; \ldots; n-2; n-1\}$).

The set Q of coordinates of the system, i.e. the elements of Q are coordinates, is denoted $Q = [Y_1] x \ldots x [Y_X] x [Z_1] x \ldots x [Z_T] = [q_0] x \ldots x [q_{x+T-1}]$. For practical reasons, $q_i$ are defined in corresponding relationship with the dimensions $Y_i$ and $Z_i$ of the system. Q defines the dimensions of the system: |Q|, its number of elements or coordinates is the number of freedoms of the system A.

The set Q expresses the values of a signal f of A as a function of Q in E, i.e. $f: Q \to E$; $x \to f(x)$. In other words, a signal is similar to f, an element of the set of the functions of Q in E, denoted $F(Q,E)$, i.e. $f \in F(Q,E)$. The set $F(Q,E)$ is known to be a vectorial space and therefore, as before, the signals f are like the vectors of the vectorial space $F(Q,E)$.

From the definition of the complex spectra in the Fourier domain, for any signal f of $F(Q,E)$:

$$f[k] = \sum_{x \in Q} \left( \hat{f}[x] \cdot \prod_{i \in [X+T]} F_{(q_i)}[k[i]][x[i]] \right)$$

and $$\hat{f}[x] = \sum_{k \in Q} \left( f[k] \cdot \prod_{i \in [X+T]} F_{(q_i)}^{-1}[k[i]][x[i]] \right)$$

$$= \frac{1}{\prod_{i \in [X+T]} q_i} \cdot \sum_{k \in Q} \left( f[k] \cdot \prod_{i \in [X+T]} \overline{F}_{(q_i)}[k[i]][x[i]] \right)$$

The set of parts of Q ($QP = \wp(Q)$), i.e. the set that contains all the subsets of Q, is denoted QP.

Let $G = \{cg_a = (g_a, key_a) / g_a \in QP$ and $a \in [n]\}$ be a family of n parts $g_a$ of Q that are mutually separate, i.e. such that if $a \neq b$ then $g_a \cap g_b = \emptyset$. The parts $g_a$ are called "bands". They are associated with a key $key_a$, which may be unique, for generating a wide variety of families of weakly correlated signals.

G is the definition of the constraints of the system: each constraint $cg_a = (g_a, key_a)$ expresses which spatio-temporal frequencies constitute the band $g_a$; frequencies outside $g_a$ have a zero amplitude.

The method in the most general sense creates n families $S_a = \{s_a(i)\}$ of signals and their versions $\hat{S}_a = \{\hat{s}_a(i)\}$ in the Fourier domain, having spectra complying with the constraints determined by G and formalized by the following properties:

1. the spectrum of a family $S_a$ is controlled by its band $g_a$, i.e.

$$\forall a \in [n], \forall i \in |S_a|, \forall k \in Q \begin{cases} k \in g_a & \Leftrightarrow |\hat{s}(i)[k]| = \mu_a \\ k \notin g_a & \Leftrightarrow |\hat{s}(i)[k]| = 0 \end{cases} \quad (1.10)$$

2. the families are decorrelated with each other, i.e.
$\forall (a,b) \in [n]^2, a \neq b \Rightarrow (\forall f \in S_a, \forall g \in S_b, \langle f | g \rangle = 0$ and $\langle \hat{f} | \hat{g} \rangle = 0)$ 3. the signals of a family are decorrelated with each other, i.e.

$$\forall a \in [n], \forall (i,j) \in |S_a|^2, \langle s_a(i) | s_a(j) \rangle = 0 \langle \hat{s}_a(i) | \hat{s}_a(j) \rangle = 0 | i \neq j$$

4. the power of a signal is controlled, i.e.

$$\forall a \in [n], \forall i \in S_a, \langle s_a(i) | s_a(i) \rangle = 1$$

From families $S_a = \{s_a(i)\}$ of signals and $\hat{S}_a = \{\hat{s}_a(i)\}$ of their complex spectra, the method generates a family $S = \{s(i)\}$ of (decorrelated) mutually orthogonal signals and the family $\hat{S}=\{\hat{s}(i)\}$ of their complex spectra, which are themselves orthogonal and have any independent power spectrum in each of the bands $g_a$.

From the families $S=\{s_a(i)\}$ of signals and $\hat{S}_a=\{\hat{s}_a(i)\}$ of their complex spectra, the method generates a family $S=\{s(i)\}$ of signals using two different methods, the choice between which depends on the intended use of the family S:

- bands are mutually dependent, which signifies that orthogonality in one band implies orthogonality in the other bands, and thus that the signals of the family S are mutually orthogonal;
- bands are independent of each other, which signifies that the signals of the families $S_a$ can be combined without restriction and implies that the signals of the family S are not always orthogonal in pairs.

Figure 7:
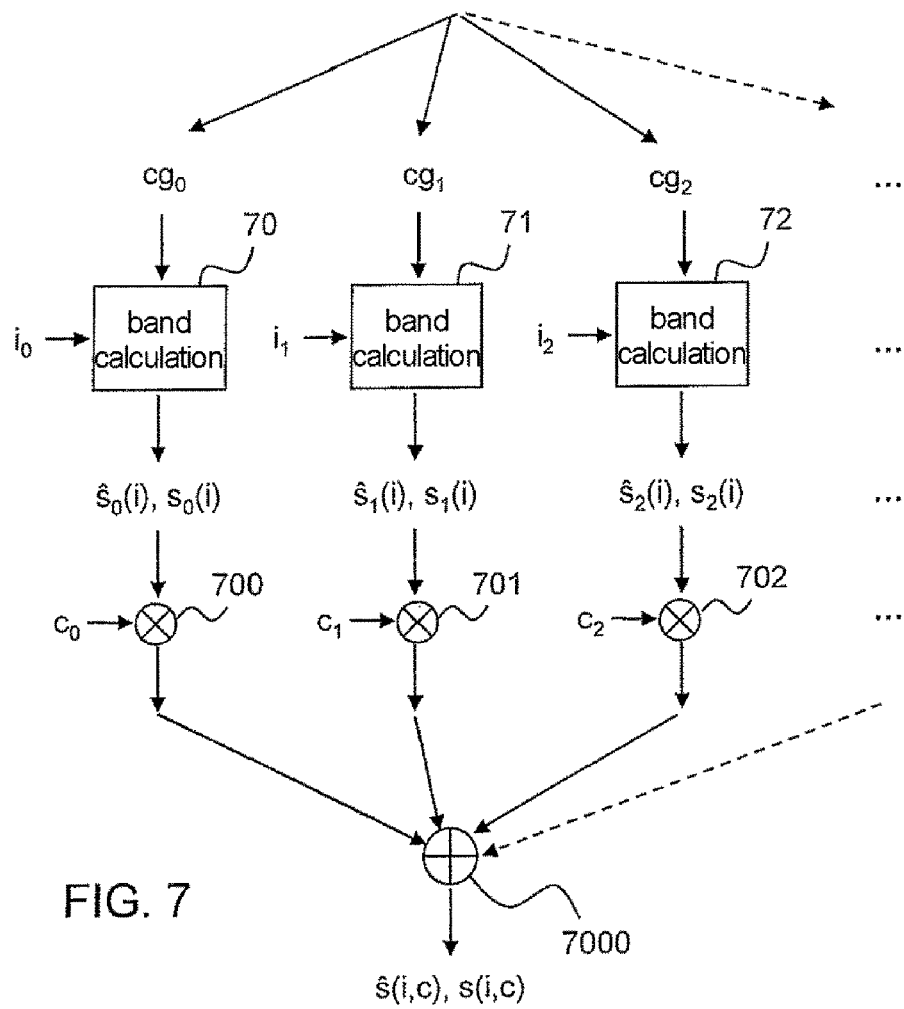
FIG. 7 is a flowchart illustrating the general method of the invention.

The FIG. 7 flowchart illustrates the most general form of the method of the present invention.

The constraint G is segmented into its constraints for each band $cg_0$, $cg_1$, $cg_2$, etc. Each band $g_a$ gives rise to the generation (via the modules 70, 71, 72, etc.) of a signal $s_a(i)$ and its variant $\hat{s}(i)$ in the Fourier domain, having a controlled spectrum. The signals created in this way are multiplied (via the modules 700, 701, 702, etc.) with a factor $c_a$ that controls the power of the signal in that band. The signals are then summed in a module 7000 to give the required complex spectrum $\hat{s}(i,c)$ and/or signals $s(i,c)$. The factors $c_a$ can be modified without changing the orthogonality (no correlation) of the spectra and signals, modifying only the balancing of the power of the signals $\hat{s}(i,c)$ and $s(i,c)$.

The general method shown in FIG. 7 uses the "band calculation" method (in the modules 70, 71, 72, etc.).

Figure 8:
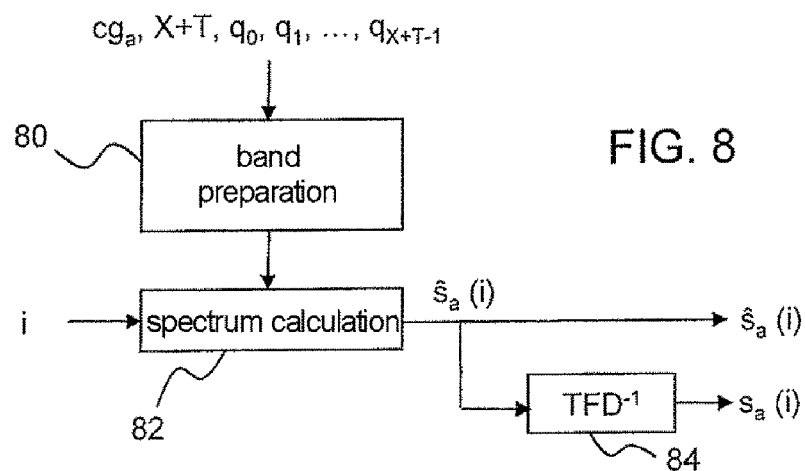
FIG. 8 is a flowchart illustrating in more detail the "band calculation" method of the FIG. 7 flowchart.

Band calculation is illustrated in more detail in the FIG. 8 flowchart. It includes a "band preparation" step 80 for determining once and for all the generation parameters used by the "spectrum calculation" method illustrated by the block 82.

The spectrum calculation method generates the complex spectrum $\hat{S}_a(i)$ of the $i^{th}$ signal from the band $g_a$. The signal $s(i)$ is simply obtained at the output of the module 84 by inverse discrete Fourier transformation of its complex spectrum $\hat{S}_a(i)$ using the formula $$s(i)[k] = \sum_{x \in Q} \left( \hat{s}(i)[x] \cdot \prod_{\alpha \in [X+T]} F(q_a)[k[\alpha]][x[\alpha]] \right),$$

possibly optimized using standard fast Fourier transform techniques.

Figure 9:
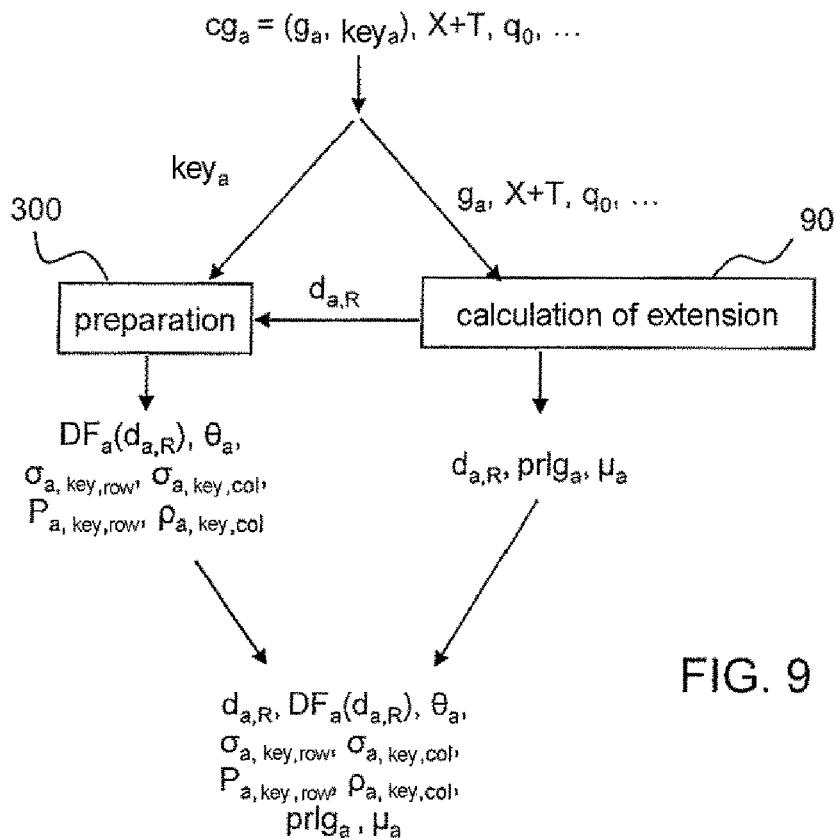
FIG. 9 is a flowchart illustrating in more detail the "band preparation" method of the FIG. 8 flowchart.

The band preparation step is illustrated in more detail in the FIG. 9 flowchart. This mechanism consists of a "prolongation calculation" module 90 which determines, as a function of the constraint $cg_a$ and the dimensions of the system, the dimension $d_{a,R}$ of the Hadamard matrices (and thus the maximum number of signals in the family) and the prolongation data $prlg_a$ used for the prolongation. The preparation module 300 is that described above with reference to FIGS. 3 and 4.

Figure 10:
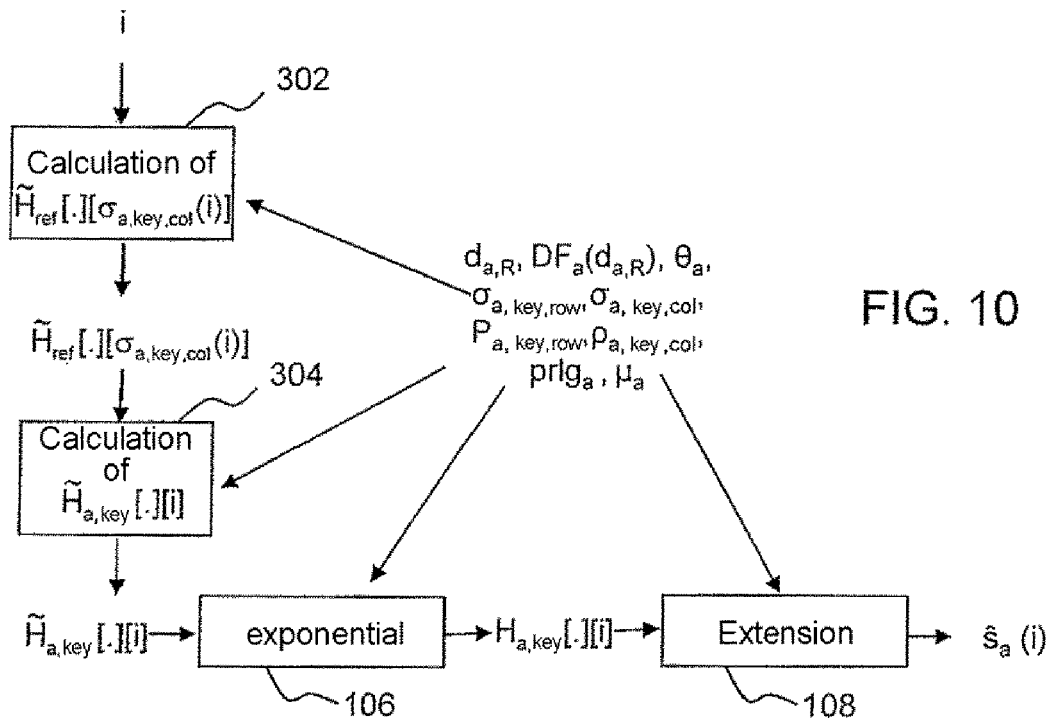
FIG. 10 is a flowchart illustrating in more detail the spectral calculation step of the FIG. 8 flowchart.
Figure 11:
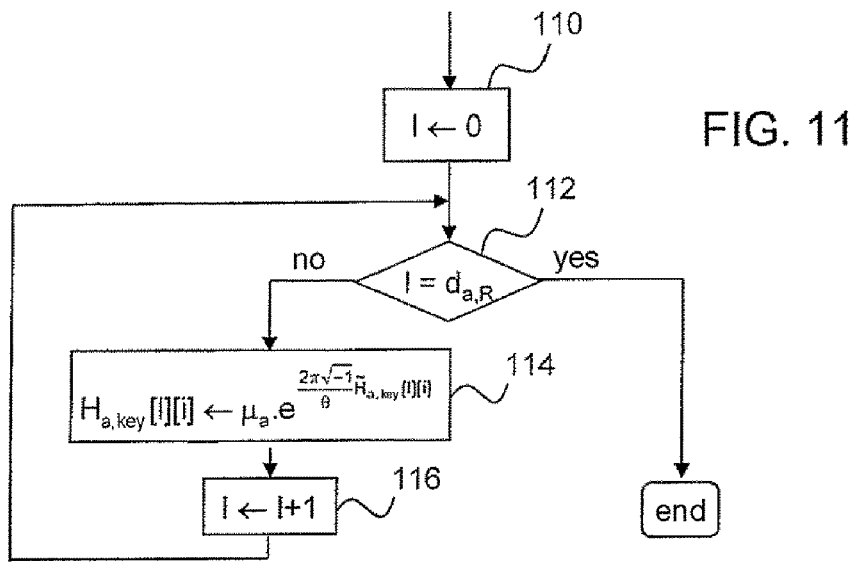
FIG. 11 is a flowchart illustrating in more detail the "exponential" step of the FIG. 10 flowchart.

The FIG. 10 flowchart shows in more detail the organization of the spectrum calculation step executed by the block 82 from FIG. 8. This step comprises:

- the step 302 of calculating $\tilde{H}_{ref}[.][\sigma_{a,key,col}(i)]$ illustrated in FIG. 3 and explained with reference to FIG. 5;
- the step 304 of calculating $\tilde{H}_{a,key}[.][i]$ illustrated in FIG. 3 and explained with reference to FIG. 6;
- an "exponential" step 106 that calculates the complex numbers corresponding to the calculated rotations and normalizes them by a scaling factor to obtain the controlled power property; the formula is:

$$H_{a,key}[l][i] = \mu_a \cdot e^{\frac{2\pi\sqrt{-1}}{\theta}\tilde{H}_{a,key}[l][i]};$$

this step is illustrated in more detail in FIG. 11;

- a prolongation step 108 for constructing the required controlled power complex spectrum $\hat{s}_a(i)$.

As FIG. 11 shows, an initialization step 110 firstly initializes a variable l to the value 0. This is followed by a test 112 that verifies if the value of the variable l has reached the maximum number $d_{a,R}$ of signals in the family. If so, the procedure terminates. If not, then $$H_{a,key}[l][i] = \mu_a \cdot e^{\frac{2\pi\sqrt{-1}}{\theta}\tilde{H}_{a,key}[l][i]}$$

is calculated during a step 114, after which the variable l is incremented by one unit (step 116) and the process returns to the test 112.

The prolongation operation 108 (FIG. 10) and the prolongation calculation operation 90 (FIG. 9) differ according to the nature of the signal required, i.e. according to whether a real signal ($E=\Re$) or a complex signal ($E=C$) is required.

Figure 12:
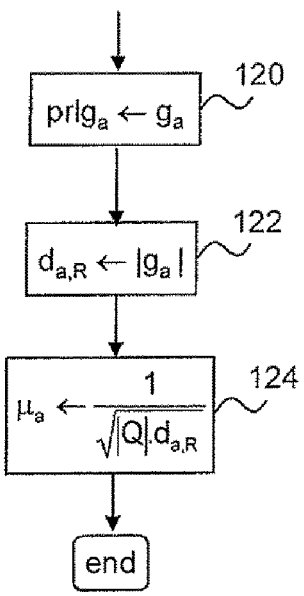
FIG. 12 is a flowchart showing in more detail the prolongation calculation step from FIG. 9 in the case of complex spectra.
Figure 13:
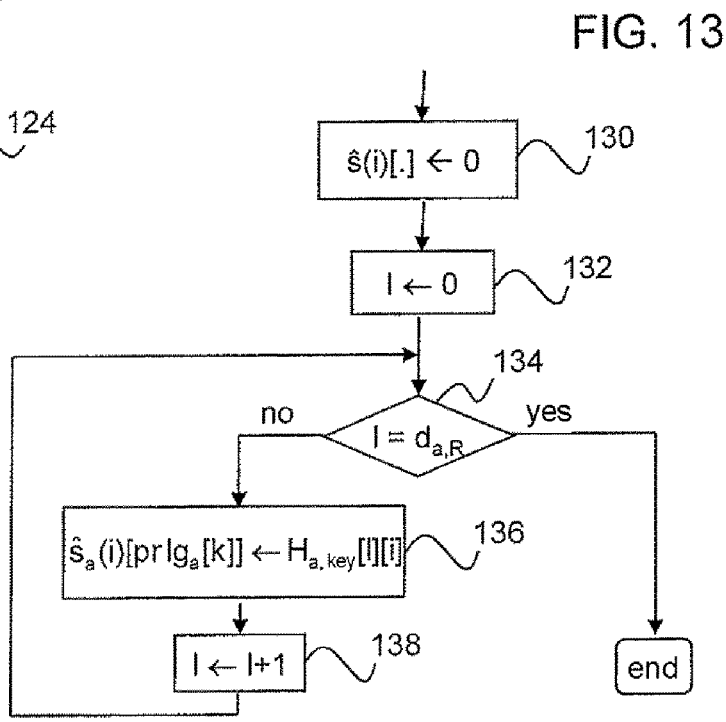
FIG. 13 is a flowchart illustrating in more detail the prolongation step from FIG. 10 in the case of complex spectra.

The FIGS. 12 and 13 flowcharts show the steps of the calculation in the case of complex signals. This is the simplest case because there are no symmetry constraints.

FIG. 12 illustrates in more detail the step 90 of calculating the prolongation of FIG. 9 in the case of complex signals. During a step 120, the value of the band $g_a$ is assigned to the variable $prlg_a$. Then, during a step 122, the value of $|g_a|$ is assigned to the variable $d_{a,R}$. There is then calculated $$\mu_a = \frac{1}{\sqrt{|Q| \cdot d_{a,R}}}$$

(step 124), which terminates the procedure. Conforming to the controlled power property, i.e. $\langle s_a(i)|s_a(i)\rangle=1$, in fact amounts to setting $$\mu_a = \frac{1}{\sqrt{|Q| \cdot d_{a,R}}}.$$

FIG. 13 illustrates in more detail the prolongation step 108 from FIG. 10 in the case of complex spectra. During a first step 130, the variable $\hat{s}(i)[.]$ is initialized to the value 0 and during a step 132 a variable l is initialized to the value 0. This is followed by a test 134 to verify if the variable l is equal to $d_{a,R}$. If so, the procedure terminates. If not, then $\hat{s}(i) [prlg_a[k]]=H_{a,key}[l][i]$ is calculated during a step 136. The value of l is then incremented by one unit (step 138) after which the process returns to the test 134.

In the case of real signals, it is necessary that $s_a(i)=\overline{s_a(\bar{i})}$. This is true when $\forall k \in Q, \hat{s}_a(i)[k]=\overline{\hat{s}_a(\bar{i})[\bar{k}]}$. This definition uses the definition of the conjugate of the coordinate k. This one-to-one relationship of Q in Q is defined in the following fashion:

$$k=(k_0, k_1, \ldots, k_{X+T-1}) \Leftrightarrow \bar{k}=(\bar{k}_0, \bar{k}_s, \ldots, \bar{k}_{X+T-S})$$

where $$\begin{cases} k_i = 0 \Leftrightarrow \overline{k}_i = 0 \\ k_i \neq 0 \Leftrightarrow \overline{k}_i = q_i - k_i. \end{cases}$$

It is seen that $k_i = \overline{k}_i$ and $q_i$ even $\Rightarrow q_i/2 = \overline{q_i/2}$.

Figure 14:
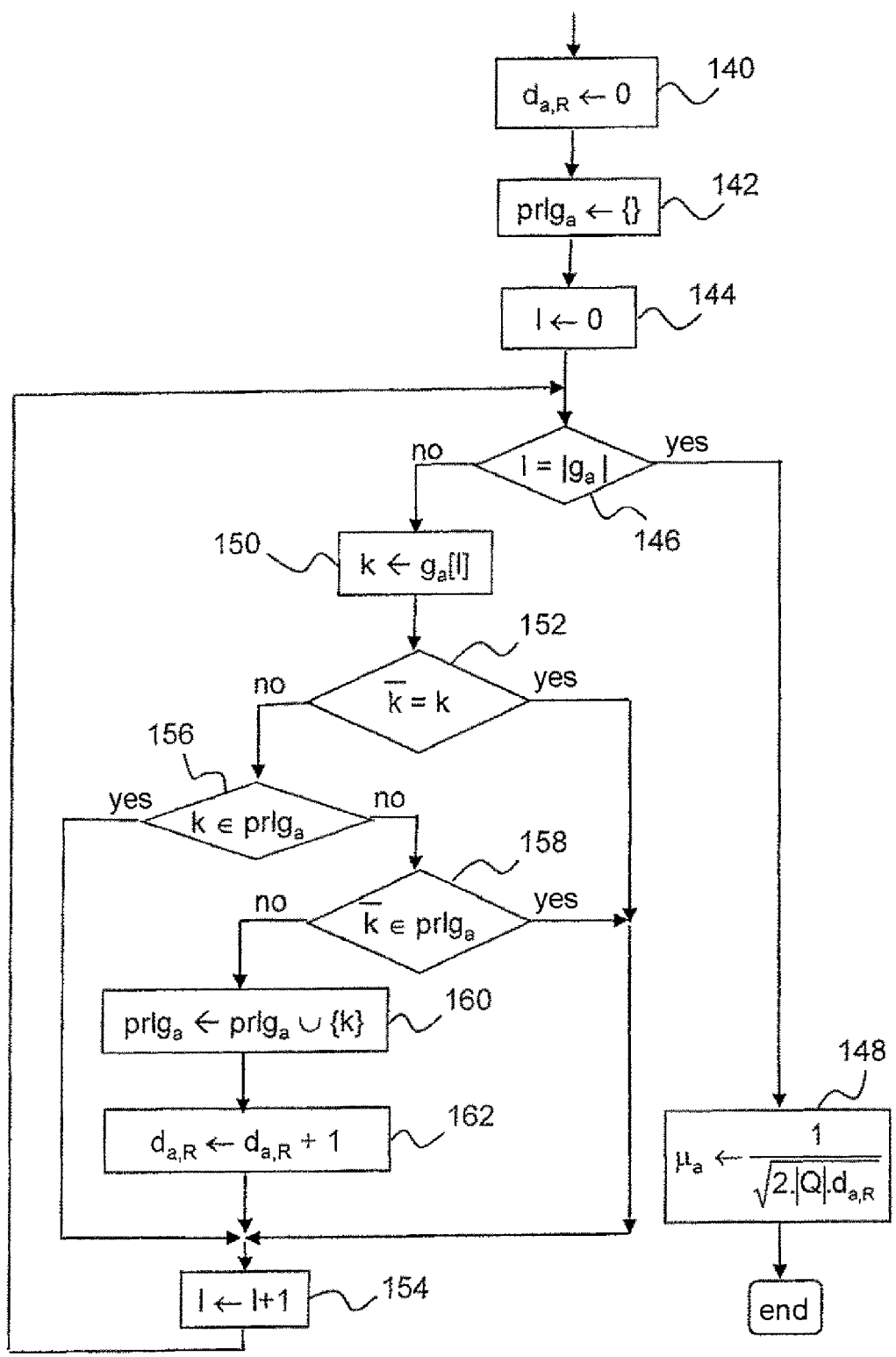
FIG. 14 is a flowchart illustrating in more detail the prolongation preparation step in the case of complex spectra.

This constraint is taken into account during the "prolongation preparation" step illustrated in detail by the FIG. 14 flowchart.

To start with $d_{a,R}$ is initialized to the value 0 (step 140), the prolongation data $prlg_a$ is initialized to the empty set (step 142), and the variable l is initialized to the value 0 (step 144).

There follows a test 146 to verify if $l=|g_a|$. If so, then $$\mu_a = \frac{1}{\sqrt{2 \cdot |Q| \cdot d_{a,R}}}$$

is calculated (step 148) and the procedure terminates. If not, the value of $g_a[l]$ is assigned to the variable k (step 150). It will be noted that the value of $\mu_a$ is different according to whether the signals are real or complex.

Then a test 152 determines if $\overline{k}=k$. If so, the value of the variable l is incremented by one unit (step 154) after which the process returns to the test 146. If not, then it is verified if $k \epsilon prlg_a$ (test 156). If so, there follows the step 154. If not, a test 158 determines if $\overline{k} \epsilon prlg_a$. If so, there follows the step 154. If not, k is added to the prolongation data (step 160), the value of $d_{a,R}$ is incremented by one unit (step 162), and there follows the step 154.

This preparation of the prolongation eliminates the elements of $g_a$ that are undesirable. Thus the dimension $d_{a,R}$ can have a different value from $|g_a|$.

Figure 15:
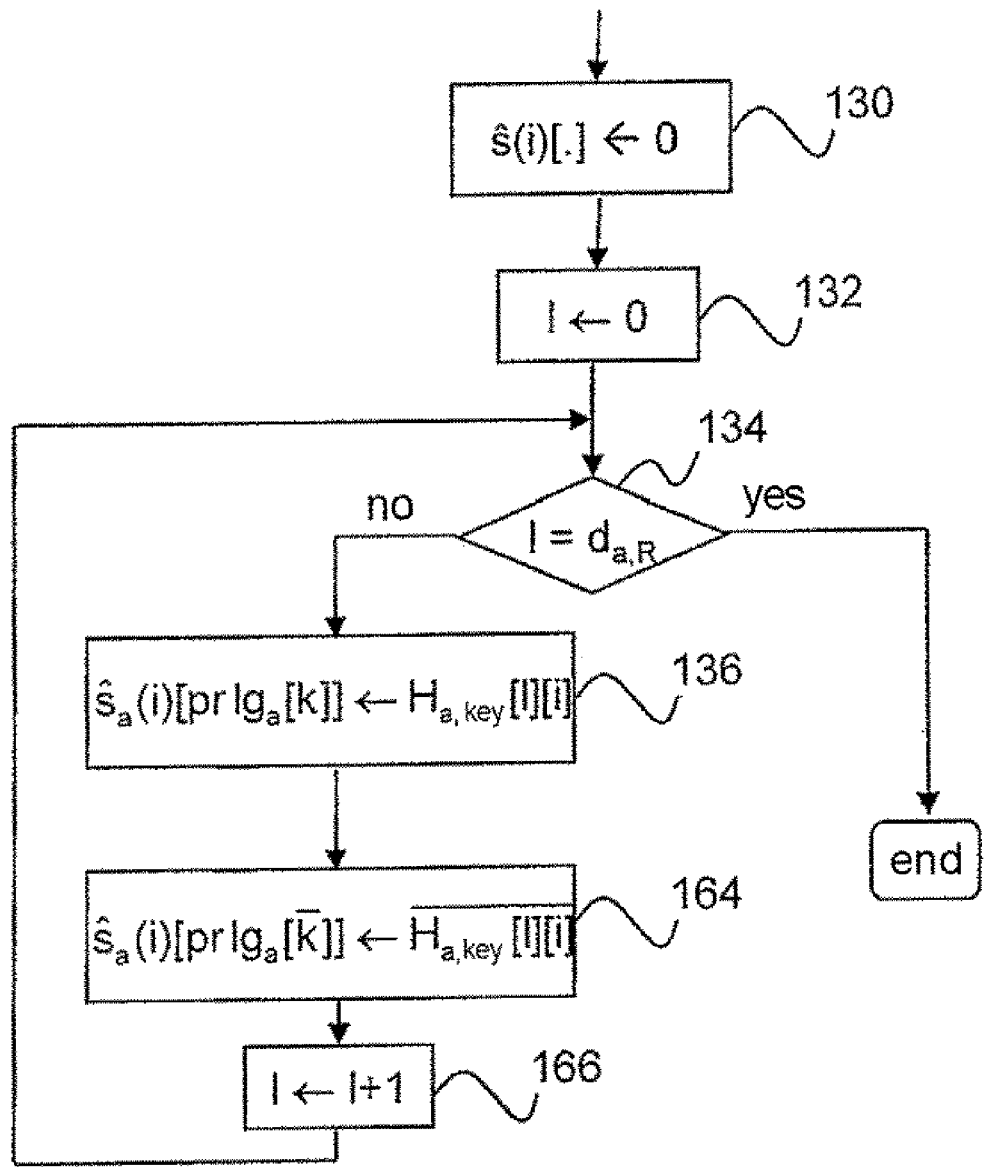
FIG. 15 is a flowchart illustrating in more detail the prolongation step from FIG. 10 in the case of real signals.

The prolongation in the case of real signals is illustrated by the FIG. 15 flowchart. The procedure is identical to that of the complex case illustrated in FIG. 13 for the steps 130 to 136 described above. In the case of real signals, the step 136 is furthermore followed by a step 164 that calculates $\hat{s}_a(i)[prlg_a[\overline{k}]] = \overline{H_{a,key}[l][i]}$. The variable l is then incremented by one unit (step 166) after which the process returns to the test 134.

This procedure provides the property necessary for the real signals: $\forall k \epsilon Q$, $\hat{s}_a(i)[k] = \overline{\hat{s}_a(i)[\overline{k}]}$. In this case, calculation shows that the factor $\mu_a$ must have the value $$\mu_a = \frac{1}{\sqrt{2 \cdot |Q| \cdot d_{a,R}}}.$$

The maximum number of signals in the family S generated according to G is given depending on the usage:
in the case of mutual dependency of the bands, which means that orthogonality in one band implies orthogonality in the other bands, $$|S| = \min_{a \in [n]} |S_a| = \min_{a \in [n]} d_{a,R};$$

in the case of mutual independence of the bands $$|S| = \prod_{a \in [n]} |S_a| = \prod_{a \in [n]} d_{a,R}.$$

The invention finds applications in numerous fields. A first example concerns tattooing audio files.

Figure 16:
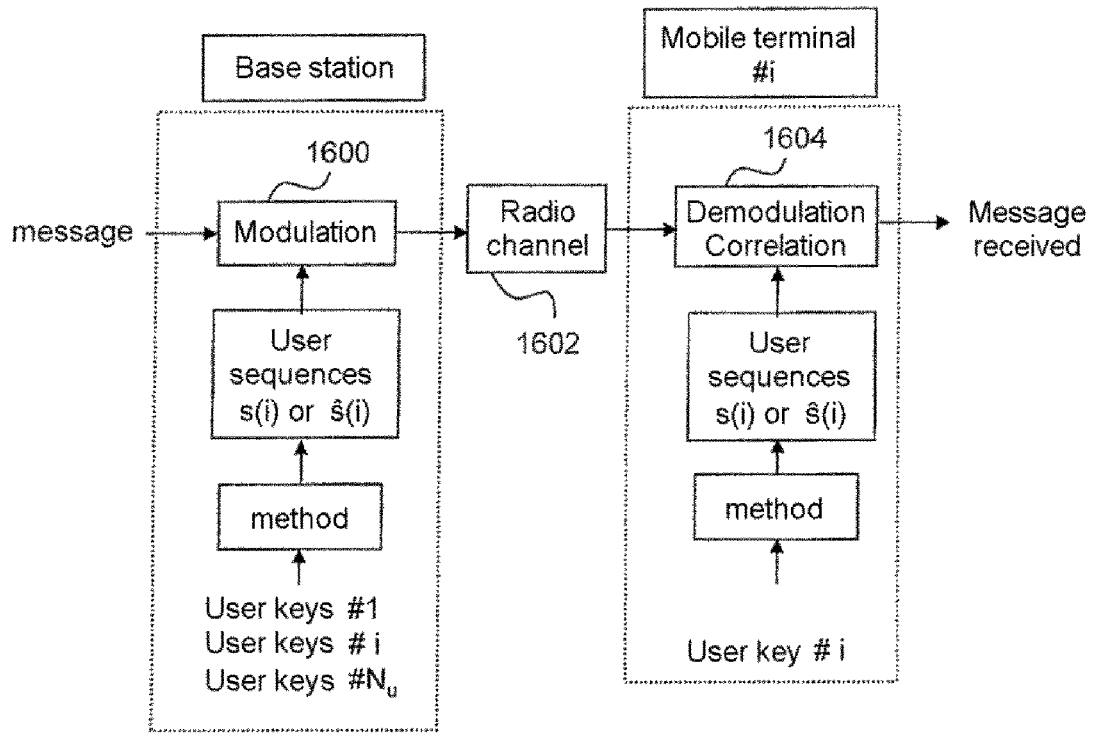
FIGS. 16 to 19 illustrate examples of application of particular embodiments of the present invention.

Orthogonal signals are also very useful for transmission, being adapted to orthogonal, bi-orthogonal and CDMA modulation. FIG. 16 shows, by way of nonlimiting example, that the method of the invention produces temporal signals or their Fourier variants with controlled discrete spectra at the message modulation level. On demodulation, the data received from the transmission channel is processed to reconstitute the messages sent. The FIG. 16 method can be used to feed a read-only memory (ROM), which avoids having the process on board.

In FIG. 16, the binary message is modulated (in a block 1600) by the signal assigned to the user #i for whom the binary data is intended. The signal is then processed to be sent over the mobile radio channel 1602. On reception, the user #i effects the correlation of the received signal (block 1604). Because the signals are orthogonal, user #i detects only data intended for him/her in the stream he/she receives.

Figure 17:
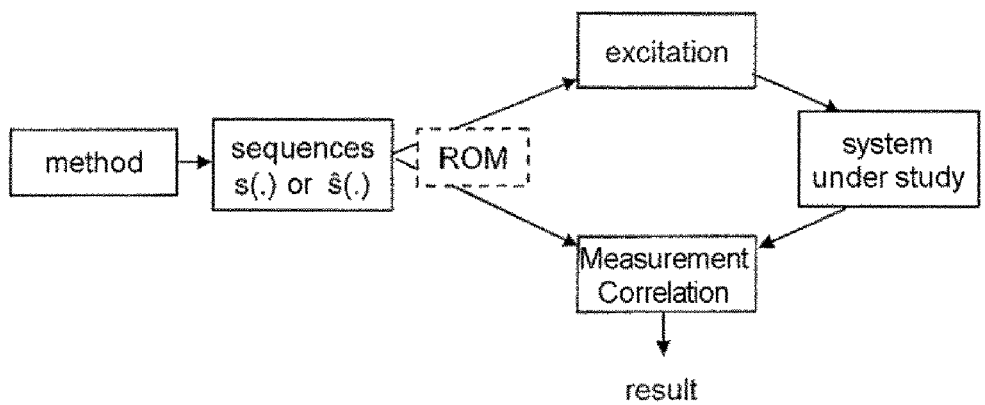

These signals can also be used in metrology, to optimize the excitation data to be supplied to the system under study, as shown in FIG. 17. This increases the relevance of the result of the measurements effected on the system under study. The FIG. 17 method can be used to feed a ROM, which avoids having the process on board.

A typical case of using metrology is that of measuring the impulse response of acoustic rooms.

To effect this measurement, a loudspeaker emits a long periodic signal sequence in which each period has a flat spectrum or a controlled spectrum, as appropriate. The periodic signal is filtered by the impulse response of the room. The signal is recovered by a microphone for processing. The percussive response of the room is obtained by establishing the intercorrelation of the signal received by the microphone and the sequence emitted.

To obtain an accurate room response, it is necessary for the sequence emitted to have a correlation function equal to a Dirac distribution. This is precisely the case of the temporal signals that are the subject of the present invention.

Correlation is effected by taking a sequence twice the size of that of the required impulse response. An efficient way to effect the correlation is to apply a discrete Fourier transform to the received signal, to multiply the frequency domain signal obtained by the conjugate complex of the Fourier transform of the orthogonal sequence, and to effect an inverse fast Fourier transform of the resulting signal. As the signals are generated in the spectral domain, it suffices to store in ROM the frequency domain version of the sequence.

These signals can also be used as a basis for signal coding or representation.

Figure 18:
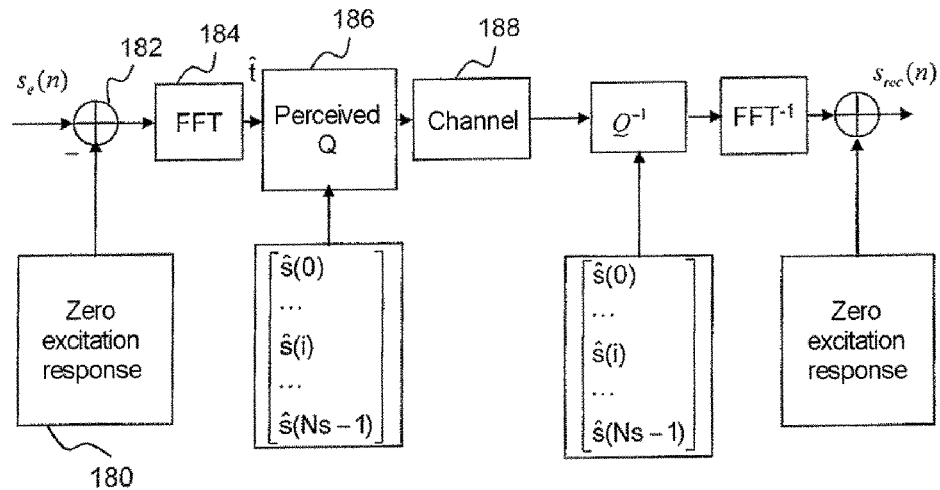

For example, these signals can be used in audio digital coding as shown by way of example in FIG. 18. The use of orthogonal complex spectra in the frequency domain enables direct coding of speech or audio signals in that domain.

As the complex spectra used have a controlled frequency extent, the quantizing noise can be shaped so that the noise faithfully tracks the masking curve over the specified bands of frequency.

The coding device illustrated in FIG. 18 includes a dictionary in which the complex spectra generated by the method of the invention are stored. This type of dictionary is used in coding or decoding audio signals to carry out the quantization and inverse quantization steps.

In one particular example, the signals are generated by Kronecker products of basic matrices, and the scalar product of the signal to be quantized by all the waveforms from the dictionary can then be achieved efficiently by a fast algorithm using butterflies, like the fast Fourier transform (FFT) or the real Hadamard transform.

For a matrix of dimension Ns generated by Kronecker products in accordance with the equation (1.9), the bit rate per sample is given by:

$$\text{Bit rate} = \log_2(Ns)/Ns$$

For the usual values of Ns of around 10, this bit rate will be fairly low. To increase it, the dictionary is enlarged by taking different matrices as the generator matrices. For example, for an order 2, there are 64 possible basic matrices, the elements of each matrix being orthogonal and chosen from $(1, -1, i, -i)$.

To be more precise, FIG. 18 illustrates the use of the mutually orthogonal complex spectra in a predictive temporal coder.

The contribution from filtering a sent signal $s_e(n)$ with zero excitation (block 180) is first subtracted from the signal (subtractor 182) to yield the target t. The target $\hat{t}$ in the frequency domain is obtained by the fast Fourier transform of t (block 184). The complex samples of the signal are quantized by a quantizer 186 defined by a dictionary containing the Ns orthogonal complex vectors $\hat{s}(0), \ldots, \hat{s}(Ns-1)$.

Operations that are the inverse of those just described are effected after passage through a transmission channel 188, finally yielding a received signal $s_{rec}(n)$.

Quantization amounts to minimizing the following criterion:

$$E_s = \|\hat{t} - gh\hat{s}(i)\|^2 \; i=0, \ldots, Ns-1$$

where h is a diagonal matrix for perceptual weighting in the frequency domain and g designates the normalization gain.

By minimizing $E_i$ there is obtained (where here $^T$ designates the transposed matrix):

$$g = \frac{\hat{t}^T h^T \hat{s}(i)}{\hat{s}(i)^T h^T h \hat{s}(i)}$$

and the index $i_{opt}$ that minimizes the error criterion is given by:

$$i_{opt} = \text{Arg}\left\{\text{Max}\left(\frac{[\hat{t}^T h^T \hat{s}(i)]^2}{\hat{s}(i)^T h^T h \hat{s}(i)}\right) \; i=0, \ldots, Ns-1\right\}$$

The numerator is equal to the scalar product of $\hat{t}^T h^T$ by all the waveforms from the dictionary generated by a Kronecker product of elementary matrices for which an efficient "Hadamard transform" type algorithm is produced. The resulting structure is based on a butterfly structure analogous to that of the FFT.

In the particular case where the normalization gain g is known, calculating the optimum index amounts to calculating the index $i_{opt}$ that maximizes $[\hat{t}^T \hat{s}(i)]^2$.

One particular example of use is segmenting the spectrum into contiguous or non-contiguous frequency bands of variable length, possibly with areas of zero amplitude at high frequencies.

In the first case, for example, the whole of the spectrum can be coded with increasing frequency zones, or frequency zones of increasing perceptual importance (deduced in this case from the scaling factors), by means of families of complex orthogonal spectra as represented in FIG. 18, each zone of the spectrum being quantized by a matrix generated by Kronecker products. The scalar product calculations involved in quantization are effected by fast transforms using the structure of the matrices. A hierarchical binary train can thus be obtained progressively, a required property for signal compression.

Figure 19:
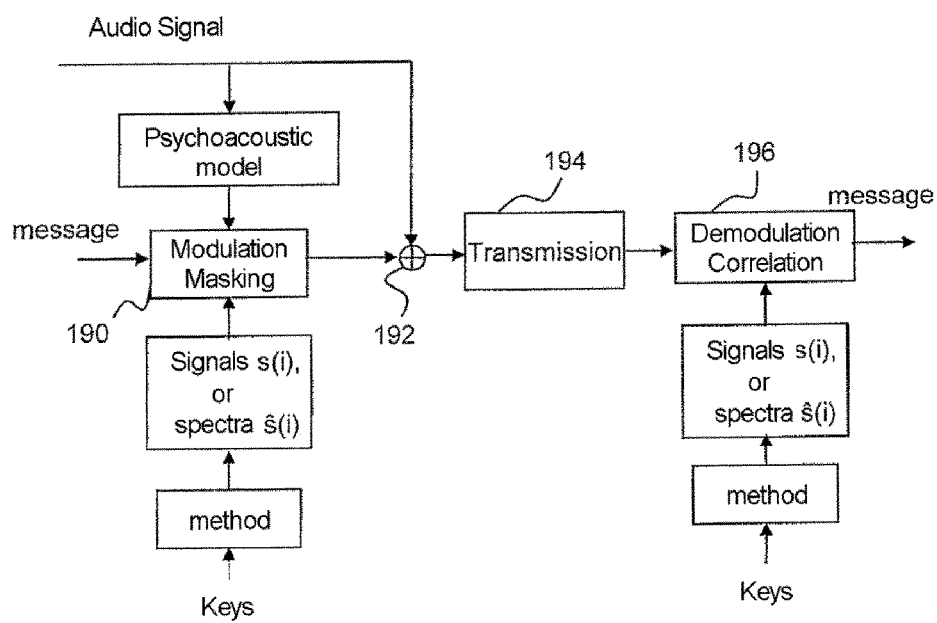

FIG. 19 represents an example of use of the mutually orthogonal signals in the case of audio tattooing. The complex spectra or signals are generated as described above, the method illustrated being either on board or functioning "offline", the signals being stored once and for all in a ROM.

To transmit a binary message of index i, the signal of index i is filtered and modulated (block 190) and the result of this operation is added to the audio signal (adder 192).

Following transmission (block 194), on reception, resynchronization is effected first and then correlation (block 196) between the received signal and all the signals from the reception dictionary. The signal detected is that which gives the maximum correlation.

The fact that the signals are controlled spectrum signals avoids unnecessary interference with the signal by inserting the potentially audible mark into zones of the spectrum which are not transmitted by the codecs anyway.

Using the signals obtained in accordance with the invention in the digital filtering domain could further be envisaged.

Figure 20:
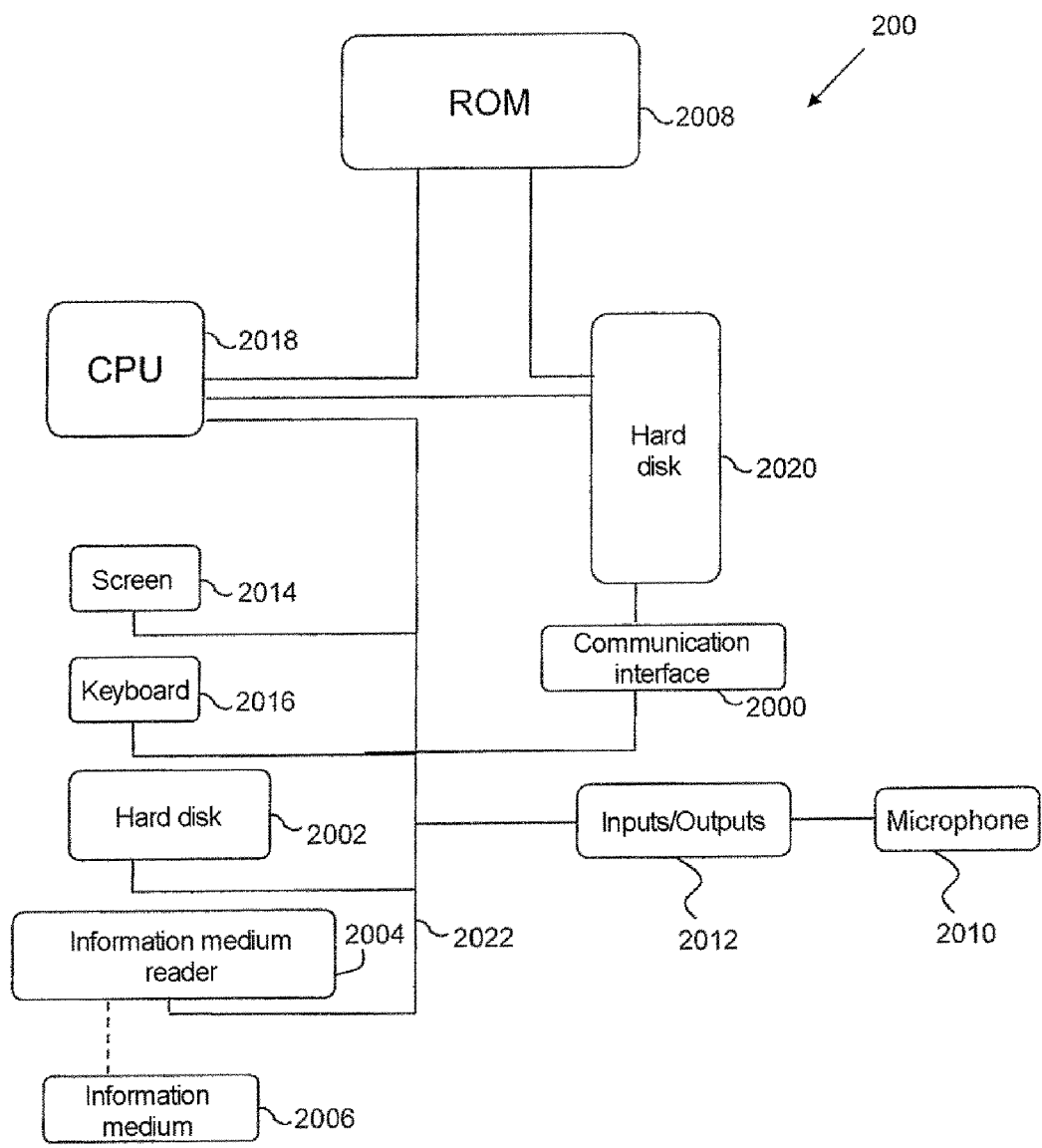
FIG. 20 represents diagrammatically a device adapted to implement one particular embodiment of the present invention.

FIG. 20 illustrates a device 200 using the method of the invention.

This device can be a microcomputer 200, for example, connected to various peripherals, at least some of which are adapted to supply information to be processed in accordance with the invention.

The device 200 can include a communication interface 2000 connected to a network (not shown). The device 200 also includes storage means 2002 such as a hard disk. It can also include a reader 2004 for information media such as diskettes, CD-ROMs or memory cards 2006. The information medium 2006 and the storage means 2002 can contain software implantation data of the invention and the code of the invention which, once read by the device 200, is stored in the storage means 2002. Alternatively, the program enabling the device to implement the invention could be stored in a read-only memory (for example a ROM) 2008. In a second variant, the program could be received via the network and stored in exactly the same way as described above.

The device 200 is connected to a microphone 2010 via an input/output card 2012. The data to be processed in accordance with the invention comes in this case from the audio signal.

This same device includes a screen 2014 for visualizing the information to be processed or to serve as an interface with the user, who can set parameters of certain processing modes using a keyboard 2016, a mouse or any other means.

A central processor unit (CPU) 2018 executes the instructions relating to implementation of the invention, which instructions are stored in the read-only memory 2008 or in the other storage elements. On power up, the processing programs and methods stored in one of the (non-volatile) memories, for example the ROM 2008, are transferred into a random-access memory (for example a RAM) 2020, which then contains the executable code of the invention and the variables necessary for implementing the invention.

A communication bus 2022 provides communication between the various subsystems of the microcomputer 200 or connected to it. The representation of the bus 2022 is not limiting on the invention and, in particular, the central processor unit 2018 is adapted to communicate instructions to any subsystem of the microcomputer 200 either directly or via another subsystem of the microcomputer 200.

The device described here is adapted to contain all or part of the processing in accordance with the invention described herein.

The invention claimed is:

1. Method of generation of a plurality of discrete spectra ŝ(i) of dimension Q, mutually orthogonal and of controlled power, i designating the number of the spectrum, said spectra representing temporal signals in the spectral domain and being of constant modulus µ in a set G designating spectrum lines and zero everywhere else, said method comprising the followings steps that are performed by processing means of a discrete spectra generating device:
   determining (20) at least part of a complex Hadamard matrix H of order $d_R$=w in the case of real signal spectra and $d_R$=2.w in the case of complex signal spectra;
   determining (22) the prolongation P of the matrix H from G and from the dimension Q; and
   obtaining (22) said controlled power spectra ŝ(i)=µ.P(H[.][i]), where H[.][i] designates the $i^{th}$ column of the matrix H.

2. Method according to claim 1, wherein the step (20) of determining at least part of the complex Hadamard matrix comprises obtaining a column ($\tilde{H}_{key}$[.][i]) of a matrix of rotations calculated from predetermined rotation and permutation keys applied to a reference Hadamard matrix ($\tilde{H}_{ref}$).

3. Method according to claim 2, further comprising a step of decomposition of the order $d_R$ of said reference Hadamard matrix into a product of factors ($f_i$), said reference Hadamard matrix being obtained by tensorial product of matrixes the sizes of which correspond to the factors of the decomposition.

4. The method of claim 3, further comprising a substep of calculation of the lowest common multiple (θ) of the set of said factors for the determination of the reference Hadamard matrix.

5. Method according to claim 1, further comprising a step (24) of determining a signal:

$$s(i)[k] = \sum_{x \in Q}\left(\hat{s}(i)[x] \cdot \prod_{\alpha \in [X+T]} F_{(q_\alpha)}[k[\alpha]][x[\alpha]]\right),$$

where:
   i designates the number of the signal,
   Q designates a set of coordinates,
   X designates the number of spatial dimensions,
   T designates the number of temporal dimensions, and
   $F_{(q_\alpha)}$ designates the Fourier matrix of order $q_\alpha$, so as to generate a plurality of mutually orthogonal temporal signals s(i).

6. Method of generation of a family of temporal signals t(i), performed by processing means of a signal generator, the method comprising combining families of mutually orthogonal temporal signals generated by the method according to claim 5, said signals having separated supports.

7. Method of using mutually orthogonal temporal or complex spectrum signals generated by the method according to claim 1, performed by processing means of a spread spectrum transmission system, for spectrum spreading in said spread spectrum transmission systems.

8. Method of using mutually orthogonal temporal or complex spectrum signals generated by the method according to claim 1, performed by processing means of an audio tattooing or audio tattooing detection device, for audio tattooing and its detection.

9. Method of controlled power mutually orthogonal complex spectra generated by the method according to claim 1, performed by processing means of an audio coder, for coding or representing audio signals quantized with the aid of a dictionary or a family of dictionaries of real or complex values.

10. Method of using controlled power mutually orthogonal temporal or complex spectrum signals generated by the method according to claim 1, performed by processing means of an optimization device, for optimization of metrology excitation data.

11. A non-transitory computer storage device having stored therein a sequence of instructions, which, when executed by the processing means of the discrete spectra generation device, cause the discrete spectra generation device to perform the method according to claim 1.

12. The method of claim 1, wherein the set G has two intervals symmetrical with respect to a median value of the [0; Q−1] interval, and wherein w is a size of each of said two intervals.

13. The method of claim 1, wherein the prolongation P is a prolongation matrix P(H) where each column of the matrix H respectively corresponds to a restriction of a column of the matrix P(H) to the set G.

14. Device for generation of a plurality of discrete spectra ŝ(i) of dimension Q, mutually orthogonal and of controlled power, i designating the number of the spectrum, said spectra representing temporal signals in the spectral domain and being of constant modulus µ in a set G designating spectrum lines and zero everywhere else, the device being characterized in that it includes:
   means for determining at least part of a complex Hadamard matrix H of order $d_R$=w in the case of real signal spectra and $d_R$=2.w in the case of complex signal spectra;
   means for determining the prolongation P of the matrix H from G and from the dimension Q; and
   means for obtaining said controlled power spectra ŝ(i)=µ.P (H[.][i]), where H[.][i] designates the $i^{th}$ column of the matrix H.

15. Device for coding audio signals, characterized in that it includes a dictionary in which are stored mutually orthogonal complex spectra generated by a device according to claim 14.

16. The device of claim 14, wherein the set G has two intervals symmetrical with respect to a. median value of the [0; Q−1] interval, and wherein w is a size of each of said two intervals.

17. The device of claim 14, wherein the prolongation P is a prolongation matrix P(H) where each column of the matrix H respectively corresponds to a restriction of a column of the matrix P(H) to the set G.

* * * * *